United States Patent [19]

Wimsatt et al.

[11] Patent Number: 4,975,949
[45] Date of Patent: Dec. 4, 1990

[54] ELECTRONIC HEADSET TELEPHONE

[75] Inventors: Jeff M. Wimsatt, Aptos; Frederick P. DeKalb, Ben Lomond; Gary L. Sanders, Saratoga; Robert J. Bernardi, Scotts Valley, all of Calif.

[73] Assignee: Plantronics, Inc., Santa Cruz, Calif.

[21] Appl. No.: 366,763

[22] Filed: Jun. 15, 1989

[51] Int. Cl.⁵ .............................................. H04M 1/00
[52] U.S. Cl. ...................... 379/387; 379/395; 379/396; 379/397; 379/413
[58] Field of Search ............... 379/397, 387, 395, 396, 379/413; 381/104, 109; 455/159

[56] References Cited

U.S. PATENT DOCUMENTS

| | | | |
|---|---|---|---|
| 4,488,006 | 12/1984 | Essig et al. | 379/413 |
| 4,756,021 | 7/1988 | Nakayama | 379/424 |
| 4,782,524 | 11/1988 | McQuinn et al. | 379/387 |
| 4,860,342 | 8/1989 | Danner | 379/354 |

Primary Examiner—Jin F. Ng
Assistant Examiner—Jhanay Augustus
Attorney, Agent, or Firm—Arnold, White & Durkee

[57] ABSTRACT

An electronic telephone set for use with a telephone headset receiver/transmitter apparatus is disclosed. The telephone set is line-powered, and is capable of transmit muting, last number re-dial, and memory dialing. The volume of the received voice signal is controllable by a user, and a visual indication of the volume setting is provided. The receiver and transmitter amplifiers includes circuitry for compensating for the frequency response characteristics of two or more headsets, the compensation circuitry being selectively and automatically engaged by means of a programmable connecting jack. The design of the telephone is such that it consumes very little power, especially during "on-hook" operation. Moreover, an electrical storage device is employed to provide continuous operational power to the dialer circuitry and electronic hook-switch control circuitry, so that the telephone set retains its dialing memory when not in use. Bell tap suppression circuitry is included to prevent the ringer from responding to sporadic voltage transients on the transmission lines, allowing the telephone can be installed in parallel with other phones.

5 Claims, 16 Drawing Sheets

ELECTRONIC HEADSET TELEPHONE

FIELD OF THE INVENTION

This invention relates to the field of telephone equipment, and more particularly relates to a telephone set having a single base and a user-worn headset.

BACKGROUND OF THE INVENTION

A very wide variety of telephone sets used to initiate and receive telephone calls has been shown in the field of telecommunications. While improvements in the field of telecommunications and electronics have introduced significant advances in the design and capabilities of telephone sets, even the simplest telephone, whether electronic or electro-mechanical in nature, must perform several fundamental tasks. Among these basic operations are: requesting use of the telephone system when the handset is lifted or the hook-switch is closed; indicating that the system is ready for use by receiving and reproducing a dial tone; sending the number of the telephone to be called to the system; indicating the status of a call in progress (e.g. "ringing", "busy", etc...) by receiving and reproducing tones indicative of the status; indicating an incoming call by means of a ringer or other audible or visual signal generator; converting the speech of a calling party into electrical signals for transmission to a distant party through the system, and converting electrical signals received from a distant party into acoustical signals; adjusting automatically to variations in the power supplied to it; and signalling the system that a call is finished when a caller "hangs up".

The connection between a calling party and a called party is established by the action of a central switching facility. Each telephone is connected to a central switching station containing signalling equipment and batteries that supply direct current (DC) power to operate the telephone set. In typical systems, each phone is connected to the central switching facility through a local loop of two wires called a wire pair or a "twisted pair". Switches in the switching station respond to dial pulses or dial tones from the telephone to connect the calling phone to the called phone. When the connection is established, the two telephones communicate by means of a current loop using current supplied by the central station's batteries.

With a conventional electro-mechanical telephone, a handset containing a receiver and a microphone rests in a cradle when the phone is not in use. The weight of the handset holds the hook-switch down, leaving the hook-switch open. In this position, called an "on-hook" condition, no current loop is established on the wire pair between the telephone set and the central switching station; however, a ringer circuit in the telephone is always connected to the wire pair from the central office, so that the telephone may detect incoming calls heralded by an AC ringing signal on the phone lines.

When the handset of an electro-mechanical telephone set is removed from its cradle, the spring-loaded hook-switch closes, completing the circuit with the central station. This is called an "off-hook" condition. The central switching station detects the newly established flow of current in the loop and issues a dial tone on the lines to indicate that the calling party can enter a telephone number specifying the called party.

Telephone numbers can be communicated to the central station either in the form of dialing pulses or dialing tones. Dialing pulses are generated by repeatedly opening and closing the hook-switch; dialing tones are generated by an electronic tone generator. The central switching station includes detection circuitry for recognizing dialing pulses or dialing tones, allowing it to automatically establish the connection to the phone specified by the caller. If the called phone handset is "off-hook" when the connection is requested, a busy tone generated by the central station is returned to the calling phone. Otherwise, a ringing signal is sent to the called phone, and a "ringback" tone is returned to the calling phone to indicate that the called phone is ringing.

When the called party removes the handset in response to a ringing signal, the loop to that phone is completed by its closed hook-switch and loop current flows between that phone and the central station. The central office then removes the ringing signal and the ringback tone from the circuit.

The transmitter of a telephone converts the acoustical signals of a caller's speech into variations in the electrical current flowing in the current loop. The receiver of a telephone converts variations in electrical current flowing the in the current loop back into acoustical signals audible to a user. A small amount of transmitted signal, called sidetone signal, is fed back into the receiver of the transmitting telephone set; this allows the user to hear his or her own voice in the receiver to determine how loudly to speak.

A telephone call is terminated when either the called or calling party "hangs up" the handset, putting the called or calling telephone in an "on-hook" condition. The central switching station detects the interruption of loop current, and releases the connection.

The aforementioned functions performed by telephone sets may be accomplished in different ways depending upon whether the telephone is of electro-mechanical or electronic design. In an electronic telephone set, for example, the action of the electro-mechanical handset hook-switch is carried out with electronic switching, rather than with mechanical reed-type switching. An electronic hook-switch, therefore, must be continually provided with a power supply, so that the hook-switch remains "open" during "off-hook" operation, and "closed" during "on-hook" operation. Similarly, electro-mechanical or "rotary" type pulse dialers can be replaced, in an electronic design, with an off-the-shelf dialer integrated circuit chip which performs the functions of generating either conventional dialing pulses, or standard dual-tone multifrequency (DTMF) dialing tones.

In electronic telephone sets, operational power for the various electronic components may either be provided from a standard household electrical receptacle, or directly from the batteries provided at a central switching station. In the former case, an AC-to-DC transformer is required for converting household AC power into DC power suitable for operating electronic devices. In the latter case, called a line-powered unit, no AC-to-DC transformer is needed, since the DC power is available on the incoming wire pair; line powered electronic telephone sets may therefore be less expensive, smaller, and lighter than electronic telephones having an AC-to-DC transformer. In designing electronic telephone sets, however, particular attention must be paid to the power consumption characteristics, in order that they not consume too much power from the central station. Low power consumption is particularly desirable during "on-hook" operation.

A further consideration in the design of line-powered electronic telephone sets is that they should be very tolerant of variations in power supplied from the central switching station's batteries, and they should be resistant to voltage surges or spikes which are liable to occur on the wire pair.

Another advantage of electronic telephone sets over their electro-mechanical counterparts is the increased measure of control over the operation of the telephone that is afforded by the electronic components. In particular, features such as memory dialing, automatic redial, muting, and volume control may be easily and inexpensively incorporated into electronic telephones; this is because these features may be implemented using compact, lightweight digital logic components, rather than with relatively expensive and bulky electromechanical relays, potentiometers and the like. Digital implementations of such features as memory dialing, volume control and so on typically require very little additional power, and may therefore be readily incorporated into line-powered or transformer powered telephone sets.

A further advantage of electronic telephones over electro-mechanical telephones arises from the ability to activate the telephone (take it to an "off-hook" condition) without physically lifting the handset. This allows for such features as "on-hook dialing", and "hands-free" operation, in which a microphone and speaker included with the telephone allow a user to dial the phone and carry on a conversation without ever lifting the handset from its cradle. In the alternative, an electronic telephone could be used in conjunction with an headset apparatus, having a receiver and a microphone, which is worn by a user. In this case, the actions of picking up and hanging up an electromechanical handset may be simulated by depressing an electronic hook-switch button.

It is an object of the present invention to provide an electronic telephone set capable of operation in conjunction with a user-worn headset. In particular, it is intended that a telephone in accordance with the present invention be compatible with various models of telephone headsets having different input impedances and frequency response characteristics. It is a further object of the present invention to provide such an electronic telephone set which is line powered, but which draws a minimal amount of power from the line, especially when in an "on-hook" state.

It is yet another object of the present invention to provide a full-featured telephone having such capabilities as memory dialing, last number redial, variable receiver volume, and transmit muting. Additionally, it is an object of the present invention to provide a telephone which is capable of initiating outgoing calls either by generating dialing pulses or by generating dialing tones, the choice of dialing pulses or dialing tones being selectable by a user.

It is still another object of the present invention to provide a line-powered electronic telephone which remains operational throughout a wide range of power supply levels.

Finally, it is an object of the present invention to provide, in a line powered telephone set, visual indications of certain operational modes of the telephone to a user.

SUMMARY OF THE INVENTION

The foregoing and other objects of the present invention are achieved in a line-powered telephone set which in one embodiment is controlled by a low-power application-specific integrated circuit (ASIC). The telephone is provided with a bank of light-emitting diodes or the like for conveying such information to the user as the current volume setting or muting status. The telephone set is of desktop design, and is intended for use with a telephone headset apparatus which may be connected to the telephone by means of a modular-type connecting jack. According to one aspect of the present invention, the modular headset jack is of a programmable type which allows the telephone circuitry to identify the type of headset connected to the modular jack.

Further in accordance with the present invention, an electronic telephone is provided with means for activating transmit muting functions, automatic memory dialing, last number redialing, as well as means for selecting either pulse dialing or tone dialing.

BRIEF DESCRIPTION OF THE DRAWINGS

The novel features believed characteristic of a telephone set of the present invention are set forth in the appended claims. The invention itself, however, as well as other features and advantages thereof, will be best understood with reference to a detailed description of a preferred embodiment which follows, when read in conjunction with the following drawings, wherein:

DETAILED DESCRIPTION OF A SPECIFIC EMBODIMENT

General Description

Figure 1:
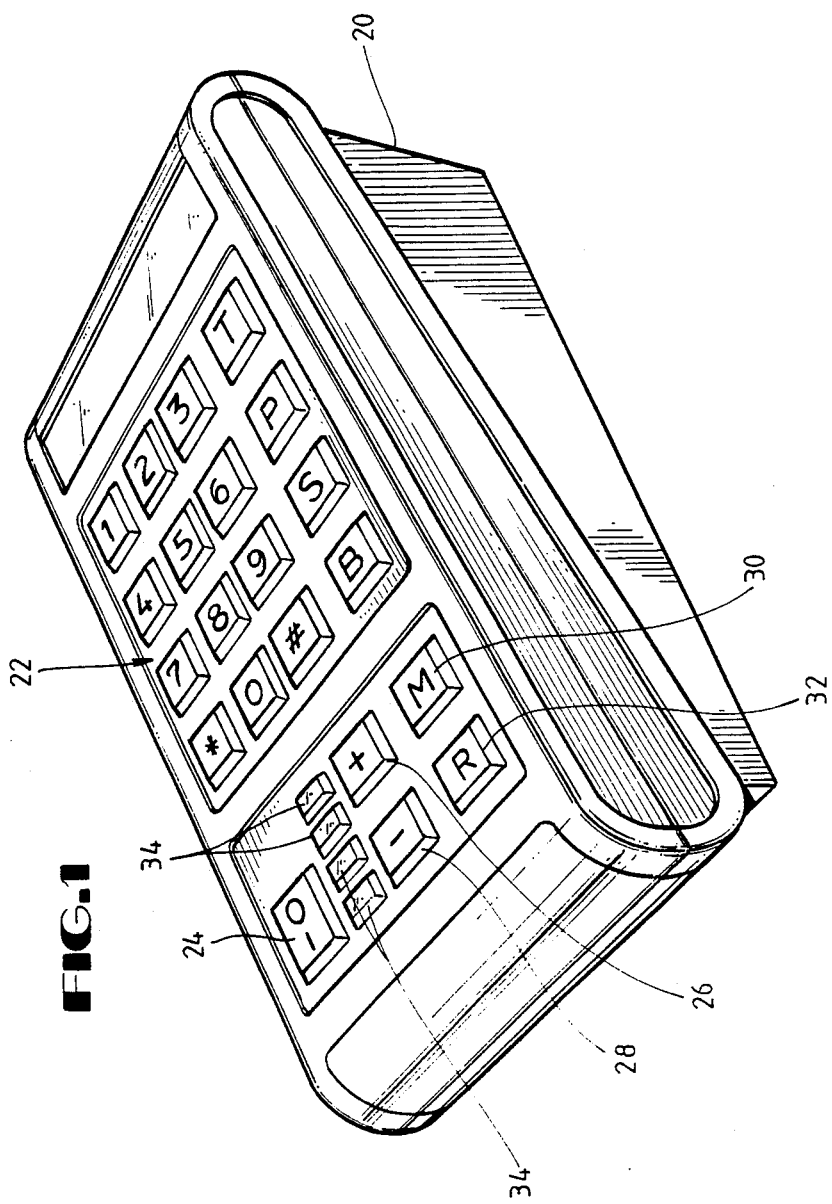
FIG. 1 is an external view of a telephone set in accordance with one embodiment of the present invention.

FIG. 1 shows an external view of a telephone set in accordance with one embodiment of the present invention. The telephone set of FIG. 1 is intended for use with a headset, not shown in FIG. 1, allowing for "hands-free" operation. With the exception of a headset, all of the components of the telephone set are contained within housing 20, which is of desk-top design made from molded plastic and having skid resistant feet (not shown). Housing 20 is nominally 3.5-inches wide, 6.9-inches long and 2-inches high.

A 6-pin modular connecting jack (on the back of housing 20, not shown) permits one of the various types of three-wire or four-wire line cord assemblies to be attached. Additionally, a 6-pin or 8-pin modular type jack (also not shown) is provided for establishing connection with the line cord assemblies of the various standard headset capsules having an acoustical receiver and transmitter to the base unit. In the case of an 8-pin jack, the extra connections may be used to allow for user adjustment of transmit levels, receive levels, headset capsule type identification, or the like. Further in accordance with the present invention, additional modular jacks may be disposed on housing 20, as necessary.

The telephone set of FIG. 1 is a complete telephone which may be used by itself, or installed in parallel with additional standard single line phones. On the top, sloped face of housing 20 is disposed an alphanumeric telephone keypad designated generally as 22. In addition to the numeric keys zero through nine, keypad 22 includes the standard "#" button and "*" button, as well as four additional #buttons, labelled "T", "P", "S", and "B", the functions of which to be hereinafter described.

Also on the top face of housing 20 are disposed an "on/off" button 24, a "+" button 26, a "−" button 28, an "M" button 30 and an "R" button 32. Finally, next to "+" button 26 and "−" button 28 is an array of four light-emitting diodes (LEDs), designated generally as 34. Since the telephone shown in FIG. 1 is electronic, and is designed for use with a telephone headset apparatus, depressing "on/off" button 24 when the telephone is "off" ("on-hook") is equivalent to taking the handset of a traditional electro-mechanical telephone out of its cradle; depressing "on/off" button 24 when the phone is "on" ("off-hook") is equivalent to replacing a traditional handset in its cradle. As a more frequently used key, therefore, "on/off" button 24 is larger than the others, and is disposed conveniently near the front of housing 20.

"+" button 26 and "−" button 28 are volume control buttons, used to increase and decrease, respectively, the volume on an attached headset. According to one aspect of the present invention, the volume on the headset is adjustable over a 15- to 20-decibel range in either four or eight steps; that is, adjustment from the lowest volume setting to the highest volume setting would require a user to depress the "+" button 26 four or eight times, and similarly, adjustment from the highest volume setting to the lowest would require a user to depress the "−" button 28 four or eight times.

LED array 34 is used in conjunction with the volume control keys 26 and 28 to provide a visual indication of the current volume setting to a user. According to the present invention, in either the four or eight volume step embodiments, one LED is on whenever the telephone is "on" ("off-hook"). At the lowest volume setting, the lowest LED in array 34 is on. In a four volume-step embodiment, the next higher LED is turned on each time "+" button 26 is depressed (the previously lit, lower LED being turned off), and the receiver volume is increased by one step, until the highest LED is on and volume is at a maximum. In a four volume-step embodiment, therefore, each LED in LED array 34 represents a single volume setting. In an eight volume-step embodiment, successively higher LEDs are turned on every two times the "+" button 26 is depressed, although volume is increased one step each time the "+" button 26 is depressed once; that is, with an eight volume-step embodiment, each LED in LED array 34 represents a range of two volume settings. When the volume is at the maximum setting, with the highest LED on, depressing the "+" button 26 has no effect.

When the volume is at a maximum setting, depressing the "−" button 28 once reduces the volume by one step. In a four volume-step embodiment, the LEDs are activated in reverse succession when the "−" button 28 is depressed; in an eight volume-step embodiment, the currently lit LED is turned off and the next lower LED turned on every two times the "−" button 28 is depressed. From a maximum volume setting, volume is adjusted to a minimum setting in either four or eight depressions of the "−" button 28; at the lowest volume setting, however, the lowest LED remains lighted to provide an indication that the telephone of FIG. 1 is "on" ("off-hook"). Further depressing the "−" button 28 at this point has no effect on the receiver volume or the LED array 34.

Figure 2:
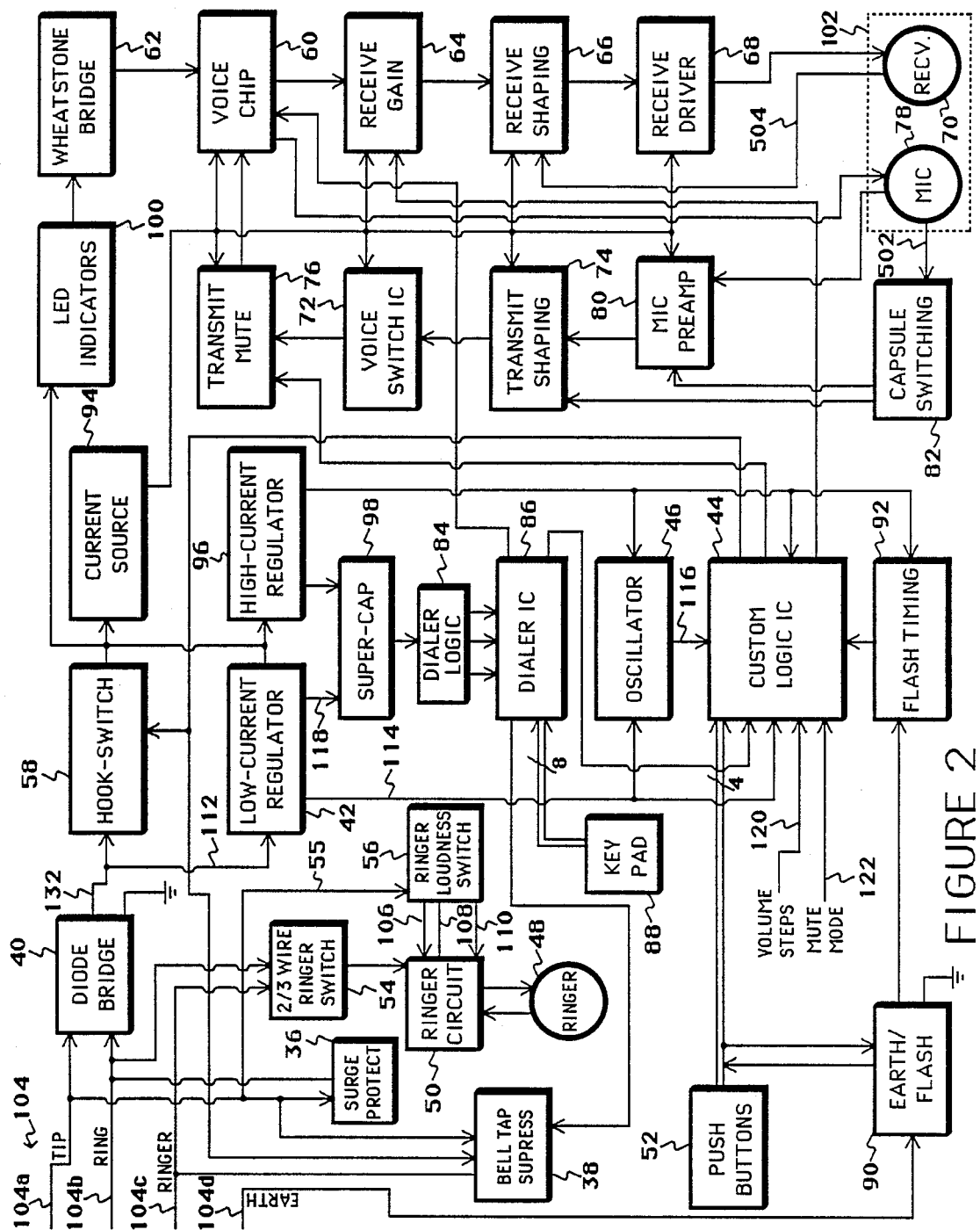
FIG. 2 is a diagram in block form showing the internal components of the telephone set of FIG. 1.

In FIG. 2, a block diagram of a headset telephone in accordance with one embodiment of the present invention is shown. In general, the circuitry comprising the phone of this embodiment of the present invention can be roughly divided into two sections, namely circuitry "before" the hook-switch, and circuitry "after" the hook-switch. With reference to FIG. 2, the circuitry before the hook-switch includes: surge protection circuitry 36; bell tap suppression circuitry 38, a diode bridge 40; a low-current regulator 42; a custom-logic integrated circuit (IC) 44; a low-current oscillator 46; a ringer 48 and corresponding ringer control circuitry 50; and a plurality of front-panel pushbuttons denoted generally as 52. Circuitry before the hook-switch further includes a plurality of user-operated switches, including "2/3 WIRE" switch 54, ringer loudness switch 56, and others not shown, for permitting various operational parameters of telephone operation to be determined, as shall be hereinafter described. The electronic hook-switch, denoted as 58, is of an improved design which will be hereinafter described in greater detail.

Circuitry after hook-switch 58 includes: a voice integrated circuit (IC) 60, receiver attenuation circuitry 62 and receiver gain control circuitry 64; receiver signal shaping circuitry 66; receiver output driving circuitry 68; an acoustical receiver 70; voice switch circuitry 72; transmit signal shaping circuitry 74; transmit muting control circuitry 76; a microphone 78 with associated preamplification circuitry 80; and capsule signal switching circuitry 82. Additionally, the after-hook-switch circuitry includes dialing circuitry, including dialer logic 84 and a dialer IC 86, which receives user-input from an alphanumeric keypad 88; an earth/flash circuit 90 and associated flash timing circuitry 92; a current source 94 for providing power to various after-hook-switch components; a high-current regulating circuit 96, and a large storage capacitor, or "super-cap", 98. Finally, after-hook-switch components include circuitry 100 associated with LED array 34, this array providing visual indications to the user regarding various operational states of the phone of the present invention, as will be hereinafter described. A headset apparatus, including receiver 70 and microphone 78 is also shown in FIG. 2, denoted collectively as 102.

The telephone of FIG. 2 is coupled to a conventional telephone transmission system by means of either three or four wires; a four-wire transmission system is shown in FIG. 2, the four lines designated as 104a, 104b, 104c, and 104d, and having the conventional names TIP, RING, RINGER, and EARTH.

In conformance with conventions in the field of telephone technology, analog voice information is communicated between the telephone and a central switching station on TIP line 104a and RING line 104b. Specifically, voice signals are represented by varying amounts of current flowing in a loop which may be thought of as originating at the central switching station, extending to the the telephone set of FIG. 1 and FIG. 2 via RING line 104b and returning to the central station via TIP line 104a. When a connection between a central switching station and a subscriber's telephone set is established, the voice signal is communicated in the form of varying amounts of current flowing in the current loop. The current in the loop is supplied from a battery at the central switching station. The acoustical transmitter (microphone) in a telephone set varies the resistance presented to the current loop by the telephone set, thus varying the current in the loop in response to the sound waves impinging upon the microphone transducer. The DC current from the battery is also used to provide operational power for the telephone's circuits. Thus, the voice signal, comprising speech-frequency variations in the current loop, is "superimposed" upon the DC current used to power the telephone.

Two variations of ringing systems are typically employed in such telephone systems. In the first, an AC "ringing" signal indicating an incoming telephone call is carried between TIP line 104a and RING line 104b to the telephone; when a phone is ringing, only the AC current is carried on the lines, since no connection (loop) has yet been established. In the second type of ringing system, TIP line 104a and a "RINGER" line 104c carry the AC "ringing" signal to the telephone ringer circuitry. The former variation is referred to herein as a two-wire ringer configuration, while the latter is referred to as a three-wire ringer configuration.

So that the telephone of the present invention is capable of operating with either a two-wire or three-wire ringer configuration, the telephone of FIGS. 1 and 2 is equipped with a 2/3 WIRE switch 54 (not shown in FIG. 1). 2/3 WIRE switch 54 is a two-position switch which receives both RING line 104b and RINGER line 104c, and which couples one or other of these two lines via output line 55 to ringer circuit 50, depending upon the position of switch 54. Thus, for a two-wire system, ringer circuit 50 can respond to a "ringing" signal between TIP line 104a and RING line 104b, while for a three-wire signal, circuit 50 can respond to a "ringing" signal between TIP line 104a and RINGER line 104c.

A RINGER LOUDNESS switch 56 allows a user to select the desired loudness level of ringer 48. In one embodiment of the present invention, RINGER LOUDNESS switch 56 has three positions: OFF, LOW, and HIGH. RINGER LOUDNESS switch 56 receives TIP line 104a as an input, and communicates with ringer circuit 50 via lines 106, 108, and 110. Upon detecting a "ringing" signal between TIP line 104a and line 55, ringer circuit 50 activates ringer 48, causing it to ring at one of two different volume levels to indicate incoming calls, the volume level depending upon whether RINGER LOUDNESS switch 56 is in the HIGH or LOW position, respectively; alternately, ringer 48 can be altogether prevented from ringing, by setting the RINGER LOUDNESS switch to the OFF position. Operation of the ringer circuitry 50, ringer 48, 2/3 WIRE switch 54, and ringer loudness switch 56 will be hereinafter described in greater detail in conjunction with FIG. 9.

Surge protector 36 is coupled between TIP input 104a and RING input 104b as these lines enter the phone, functioning to protect the rest of the circuitry against high-voltage surges which could occur on these lines. Surge protector 36 is a very fast-acting device which uses an internal silicon-controlled rectifier or the like to short TIP 104a and RING line 104b together when a voltage surge exceeding a predetermined threshold value appears. According to one embodiment of the present invention, surge protector 36 shorts TIP 104a and RING 104b together whenever the voltage between these lines exceeds 230-volts, while all components which could otherwise be exposed to a surge on these lines are rated to permit voltages of 350-volts without damage. It is further contemplated that surge protection circuitry 36 may be itself protected against voltage surges, by means of a fuse, not shown in FIG. 2.

Bell-tap suppression circuitry 38 is employed in the telephone set of the present invention to prevent voltage transients created on the current loop during pulse dialing from appearing like an AC ringing signal to ringers connected to the line, either in the dialing phone, or in other phones connected in parallel with the dialing phone. The high-voltage transient spikes are produced on TIP line 104a and RING line 104b each time the flow of loop current is interrupted for dial pulsing. These spikes of increased voltage can cause a telephone's ringer to sound as the dialing pulses are generated. Bell-tap suppression circuitry 38 functions to shunt the ringer with a low resistance during pulse dialing, diverting the voltage transients away from the ringer's ringing signal detection circuitry.

Diode bridge 40 is also situated between TIP 104a and RING 104b telephone inputs, providing a fixed-polarity signal on output line 132, which line in turn supplies power to electronic hook-switch 58. As will be hereinafter described, diode bridge 40 has a 400-volt breakdown rating, such that any voltage exceeding 400-volts is dissipated to ground via ground line 86.

Low-current regulator 42 also receives the output signal of diode bridge 40, via line 112. Since hook-switch 58 is of electronic, rather than electro-mechanical design, low-current regulator 42 is required to provide power to hook-switch 58 and control logic IC 44 even when the telephone of FIG. 2 is not in use, in an "on-hook" state. Accordingly, output line 114 of low-current regulator 42 carries the small amounts of power needed to operate custom logic IC 44 and its associated oscillator 46, which provides a logical clock signal to IC 44 on line 116. Additionally, output line 118 from low-current regulator 42 provides a "trickle-charge" signal to super-cap 98. According to one aspect of the present invention, super-cap 98 is a large storage capacitor which functions as a rechargeable power-supply for providing continuous "on-hook" power to dialer IC 86, so that this IC can maintain its memory for storing phone numbers during periods when the telephone of FIG. 2 is not in use. Details of the operation of super-cap 98 will be provided below, with reference to FIGS. 3 and 4.

Custom logic IC 44 controls many of the electronic circuits of the telephone set of the present invention, including transmit muting circuitry, volume control circuitry, LED display circuitry, as well as electronic hook-switch circuitry. Since it controls hook-switch 58, IC 44 also works in conjunction with dialer IC 86 to perform pulse dialing.

Dialer logic 84 includes two switches, not shown in FIG. 2, called DP/DTMF, and MANUAL RESET. The DP/DTMF switch is used to indicate to the telephone circuitry, specifically to dialer IC 86, whether the telephone should generate dialing pulses or dual-tone multi-frequency dialing tones on the telephone lines to initiate outgoing telephone calls. In the dialing pulse position (DP), the DP/DTMF switch generates a signal received by dialer IC 86 indicating that outgoing calls are to be initiated by "pulsing" the telephone lines in the conventional manner (repeatedly interrupting the current loop established by TIP line 104a and RING line 104b). In the dialing tone position (DTMF), the DP/DTMF switch generates a signal indicating that dialer IC 86 should generate conventional DTMF dialing tones on TIP line 104a and RING line 104b to initiate outgoing calls. Additionally, a MANUAL RESET switch generates a signal which indicates that dialer IC 86 should be reset. Details of the operation of the dialer logic 84 and dialer IC 86 will be hereinafter provided with reference to FIG. 10.

Two custom logic IC input signals, called VOLUME STEPS and MUTE MODE, are received by custom logic IC 44 via lines 120 and 122, respectively. When the signal on line 120 is high (3- to 5-Volts), the volume of receiver 70 can be adjusted within a 15- to 20-dB range in eight steps; when the signal on line 120 is low (0-Volts), the volume can be adjusted within the same 15- to 20-dB range in four steps. Adjustment of the volume is accomplished by means of "+" button 26 and "−" button 28, as previously described. The signal on line 122 determines the function of "M" button 30 on the top face of housing 20. "M" button 30 controls the transmit muting feature of the telephone of FIGS. 1 and 2, which feature allows a user to prevent sound from being transmitted from the phone. The muting function of the phone transmit signal may be selected, according to the signal on line 122, to be either a "toggled" mute or a "momentary" mute. A toggled mute is activated and deactivated, alternately, every time the mute button is depressed; a momentary mute is activated only while mute button 30 is depressed. In toggled mute mode, the mute function is also deactivated every time the phone is put in an "on-hook" state. When the signal on line 122 is high, the phone operates in momentary mute mode; when the signal on line 122 is low, the phone operates in toggled mute mode. Means for setting the values of the VOLUME STEPS and MUTE MODE input signals on lines 120 and 122 will be described in greater detail with reference to FIG. 6.

An EARTH/FLASH switch and related circuitry, designated collectively as 90 in FIG. 2, determines the function achieved by depressing "R" button 32 button shown in FIG. 1. The EARTH/FLASH switch has two positions. In the EARTH position, depressing "R" button 32 on the top panel of the telephone of FIG. 1 causes externally received RING line 104b to be shorted with incoming EARTH line 104d for as long as "R" button 32 remains depressed; this feature is used with so-called "ground start" systems, in which grounding RING line 104b (by coupling it to EARTH line 104d) indicates to certain switching stations that the line has been selected for use. Ground-start lines are used, for example, with private-branch exchange (PBX) systems, and in other situations where it is desirable to detect a line that has been selected for use instantaneously from either end of the line. With the EARTH/FLASH switch in the FLASH position, on the other hand, depressing "R" button 32 initiates a timed interruption of the current loop (a timed opening of hook-switch 58); this feature is employed when a user wishes to terminate a connection. The duration of the timed opening of hook-switch 58 in response to depressing "R" button 32 is determined by flash timing circuitry 92, which is a simple one-shot pulse generator circuit described in greater detail in FIG. 6. Typically, the duration of the timed opening of hook-switch 58 is sufficient (50-milliseconds or more) to terminate a connection with the central switching station. With EARTH/FLASH switch in the FLASH position, therefore, a user may terminate an outside connection ("hang up" the phone of FIGS. 1 and 2) by depressing "R" button 32. Details of the operation of the EARTH/FLASH circuitry 90 will be hereinafter provided with reference to FIGS. 3 and 6.

Central to the voice-signal circuitry of the telephone of the present is voice chip 60, which functions to interface the four-wire receiver/transmitter network of the telephone set to the two-wire network of the current loop. Voice signals generated by headset microphone 78 are first amplified by pre-amplification circuitry 80; next, the frequency spectrum of the voice signal is "shaped" by transmit shaping circuitry 74, in order to compensate for the imperfect frequency response of microphone 78. According to one aspect of the present invention, microphone preamp 80 and transmit shaping circuitry 74 are responsive to signals from capsule switching unit 82 to adapt the function of these components to the particular frequency response characteristics of transmitter microphone 78. Capsule switching circuit 82 identifies the type of capsule microphone being used, and issues signals to preamp 80 and shaping circuitry 74 selecting one of two or more different modes of frequency compensation.

The voice signal output of transmit shaping circuitry 74 is coupled to voice switch IC 72, which functions to reduce the level of background noise in the voice signal. Next, the voice signal is subject to selective muting, in transmit muting circuit 76. Finally, the voice signal to be transmitted on the line is forwarded to voice chip 60. Voice chip 60 also receives the incoming (receiver) voice signal from the wire pair. Voice chip 60 passes the incoming signal to receive gain circuitry 64, along with a fraction of the transmitted voice signal (a sidetone signal). Receive gain circuitry 64 amplifies the receiver/sidetone signal. The amplified signal is then subject to frequency response compensation, just as with the transmitted signal. Receive shaping circuit 66 is also responsive to a signal on line 504 from capsule receiver 70, the signal identifying the type of receiver 70. The receive/sidetone signal is then amplified by receive driving amplifier 68, and converted to an acoustical signal by headset receiver 70.

POWER SUPPLY AND CONTROL CIRCUITS

Figure 3:
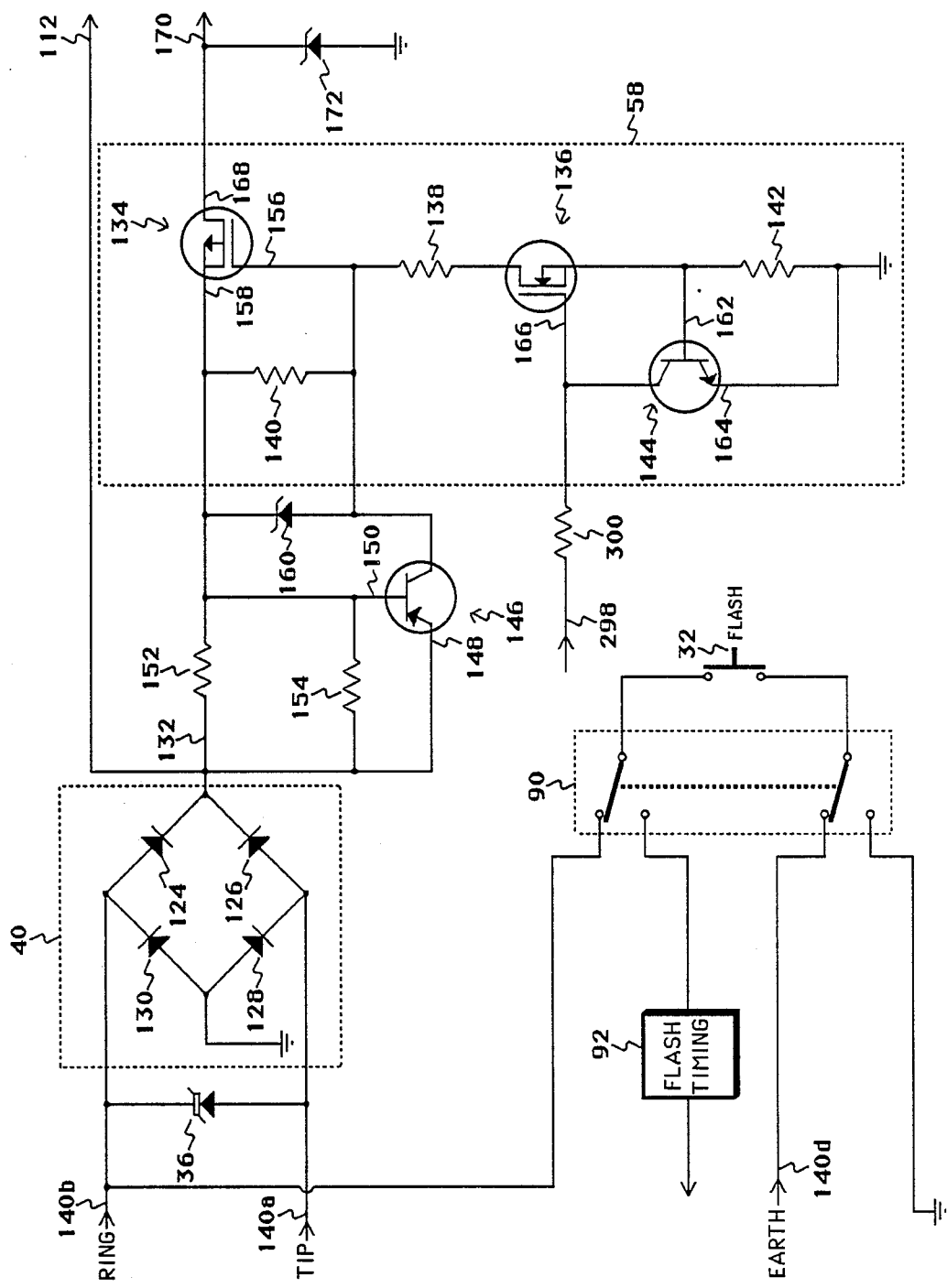
FIG. 3 is a schematic diagram of the surge protection circuits and electronic hook-switch in the telephone set of FIGS. 1 and 2.

Referring now to the schematic diagram of FIG. 3, a portion of the before-hook-switch circuitry is shown in detail, wherein components previously depicted in FIG. 2 have retained their reference numerals. TIP line 104a and RING line 104b are received by diode bridge 40, consisting of four discrete diodes 124, 126, 128, and 130, which may be one of the various commercially available diodes, such as 1N4004 devices or the like, available from various manufacturers. In a conventional manner, diode bridge 40 provides a fixed polarity (DC) signal on output line 132, with the aforementioned voice signal superimposed thereon. Positive DC voltage on RING 104b follows the path of diode 124 to diode bridge output 132, while negative voltage is prevented from doing so. Likewise, positive DC voltage on TIP 104a follows the path of diode 126 to the diode bridge output 132, and negative voltage is prevented from doing so. Should the voltage on either RING 104b or TIP 104a exceed 400-Volts, breakdown currents follow the reverse-bias path of diodes 128 and 130 to ground.

Surge protector 36, which may be a silicon-controlled rectifier such as an RCA Surgector or the like, prevents diode bridge 40 and electronic hook-switch 58 from being exposed to very large voltages which could cause overloading or breakdown of these components. In accordance with one embodiment of the present invention, voltages between TIP line 104a and RING line 104b exceeding 230-Volts cause surge protector 36 to short these lines together.

Also shown in FIG. 3 is electronic hook-switch 58, which includes two enhancement-mode VMOS transistors 134 and 136, resistors 138, 140, and 142, and bipolar pnp transistor 144.

The fixed polarity diode bridge output signal on line 132 is used to provide power to various components of the telephone, including hook-switch 58, during periods when the telephone is in an "on-hook" condition, not in use. Transistor 146 functions to limit the amount of current delivered to the phone by RING line 104b and TIP line 104a lines to approximately 130-mAmps. Notice that the emitter 148 and base 150 of transistor 146 are coupled via the parallel combination of resistors 152 and 154. When the voltage across resistors 152 and 154 exceeds the threshold voltage of transistor 146 (approximately 0.7-volts), transistor 146 turns on, allowing excess current to pass through resistor 138 in electronic hook-switch 58. This causes the voltage at the gate 156 of VMOS transistor 134 to be increased with respect to the voltage at source 158 of transistor 134, and allows voltage transients and overloads to be absorbed in resistor 138. Zener diode 160 limits the gate-to-source voltage of transistor 134 to a safe value, such as 12-volts or so. Moreover, in order to prevent overheating of resistor 138, transistor 144 functions to limit the current through VMOS transistor 136. Transistor 144 senses the voltage drop across resistor 142 via its base lead 162 and emitter lead 164, this voltage drop indicative of the amount of current flowing through transistor 136. When the voltage across resistor 142 exceeds 0.7-volts, transistor 144 turns on, decreasing current received at gate of VMOS transistor 136, consequently reducing the drain-to-source current conducted through transistor 136.

Operation of electronic hook-switch 58 proceeds in the following manner: When n-channel enhancement-mode VMOS transistor 136 is not conducting, no current flows through resistors 138 or 140, and accordingly there is no voltage drop across these resistors. P-channel enhancement-mode VMOS transistor 134 conducts when the voltage at its gate 156 is negative with respect to the voltage at its source 158; thus when no current flows through resistor 140, transistor 134 is non-conducting. When a positive voltage is applied to the gate 166 of transistor 136, however, current is conducted along the drain-to-source path of that transistor, this current provided through the series connection of resistors 140 and 138 from the output 132 of diode bridge 40. This current through resistor 140 produces a voltage at gate 156 of transistor 134 which is negative with respect to the source 158, permitting current to flow along the source-to-drain path of this transistor.

Summarizing, the particular configuration of electronic hook-switch 58 shown in FIG. 3 allows a 2.5-to 4.0-volt digital voltage applied to gate 166 of transistor 136 to control the gate of switch transistor 134. This electronic hook-switch is highly efficient, since when the phone is in an "on-hook" condition only small leakage currents flow in the hook-switch circuitry, with neither transistor 134 nor 136 fully conducting. When a positive voltage is applied to the gate 166 of transistor 136, transistor 136 turns on, drawing current through resistors 138 and 140 and decreasing the gate voltage (with respect to the source voltage) of switch transistor 134. This causes transistor 134 to turn on, allowing conduction on the path between its source 158 and its drain 168.

The circuit shown in FIG. 3 has two outputs, designated therein as 112 and 170. Output 112 serves as a power supply to components of the telephone when the telephone is in an "on-hook" condition with electronic hook-switch 58 "open", drawing DC power from TIP line 104a and RING line 104b, at the output 132 of diode bridge 40. Output 170 provides a power supply and a path for the voice signal when the telephone is in an "off-hook" condition, with electronic hook-switch 58 "closed". Zener diode 172 coupled between "off-hook" output 170 and ground prevents the voltage on line 170 from exceeding 12-volts, thus protecting "after-hook-switch" circuitry from voltage surges. It should be further noted that the telephone voice signals are also conducted along line 170 through hook-switch 58, when hook-switch 58 is closed ("off-hook").

Figure 4:
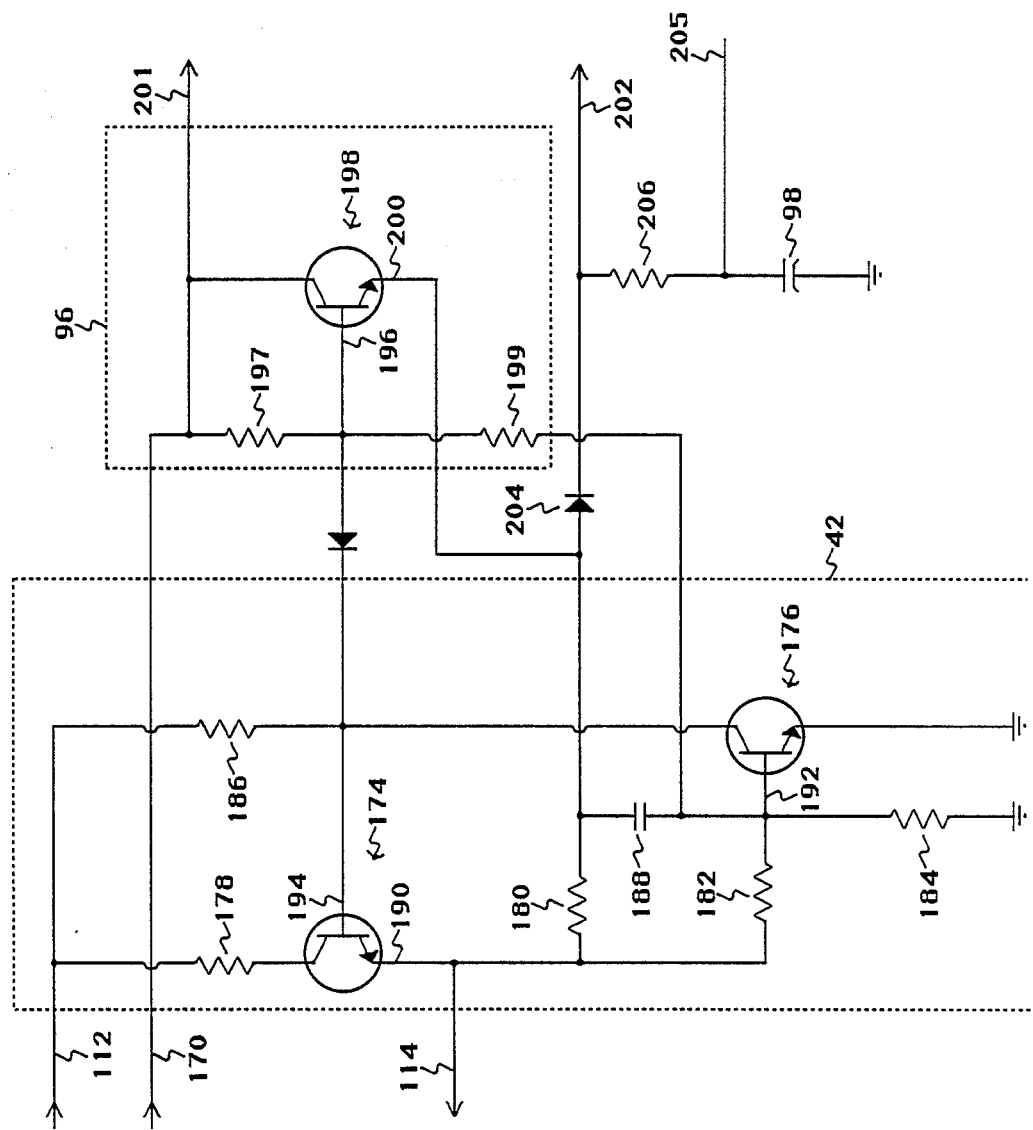
FIG. 4 is a schematic diagram of the low current and high current regulators in the telephone set of FIGS. 1 and 2.

Referring now to FIG. 4, another portion of the circuitry of one embodiment of the present invention is shown. This portion of the circuitry receives the "on-hook" and "off-hook" power supply lines 112 and 170 from FIG. 3. In particular, "on-hook" supply line 112 is received, as shown in FIGS. 2 and 3, by low-current regulator 42, which includes bipolar transistors 174 and 176, as well as resistors 178, 180, 182, 184 and 186, and capacitor 188. Resistors 182 and 184 function as a voltage divider for sensing the output at the emitter terminal 190 of supply transistor 174. Depending on the voltage at the base 192 of transistor 176, (between the series connection of resistors 182 and 184), transistor 176 conducts more or less current through resistor 186, decreasing or increasing the voltage at the base 194 of transistor 174. In this way, current flowing from the emitter 190 of transistor 174 is regulated. Line 114, coupled to the emitter 190 of transistor 174 carries the output of low-current regulator 42 to the power supply terminal of custom logic IC 44, which IC must be powered at all times in order to monitor input signals indicating when the telephone is taken "off-hook".

With continued reference to FIG. 4, "off-hook" power supply line 170 is received by high-current regulator 96. When the telephone is "off-hook", a supply voltage on line 170 is provided by the electronic hook-switch switching transistor 134, as previously described with reference to FIG. 3. When hook-switch 58 is closed, therefore, the voltage at the base 196 of transistor 198 is raised, due to current flowing through the series connection of resistors 197 and 199. The increased voltage at the base 196 of transistor 198 causes transistor 198 to turn on, providing current from its emitter 200. As shown in FIG. 4, emitter 200 is coupled to line 202 via diode 204. Line 202, in turn, provides "off-hook" power to dialer IC 86. In addition, resistor 206 is coupled to line 202; current from emitter 200 is thus used, during "off-hook" operation, to charge super-cap 98. As previously noted, super-cap 98 is a very large storage capacitor, with a capacitance on the order of 0.047-Farad or so, which functions as a rechargeable battery. During "on-hook" operation, no power is supplied on line 170, and thus no power is supplied from emitter 200 of transistor 198. Since dialer IC 86 includes memory storage locations for storing phone numbers for repertory dialing, dialer IC 86 must have a constant source of power in order for this memory to be maintained. Accordingly, during "on-hook" operation, dialer IC power is supplied from charge stored on super-cap 98, via line 202. Diode 204 prevents charge on super-cap 98 from leaking back into current regulators 42 or 96.

When the phone is first connected to transmission lines 104, super-cap 98 is charged in a few seconds after taking the receiver "off-hook", by the operation of high-current regulator transistor 198 as previously described. When the receiver is subsequently placed back "on-hook", super-cap is continuously "trickle-charged" through the operation of low-current regulating transistor 174, via resistor 180, diode 204, and resistor 206.

Figure 5:
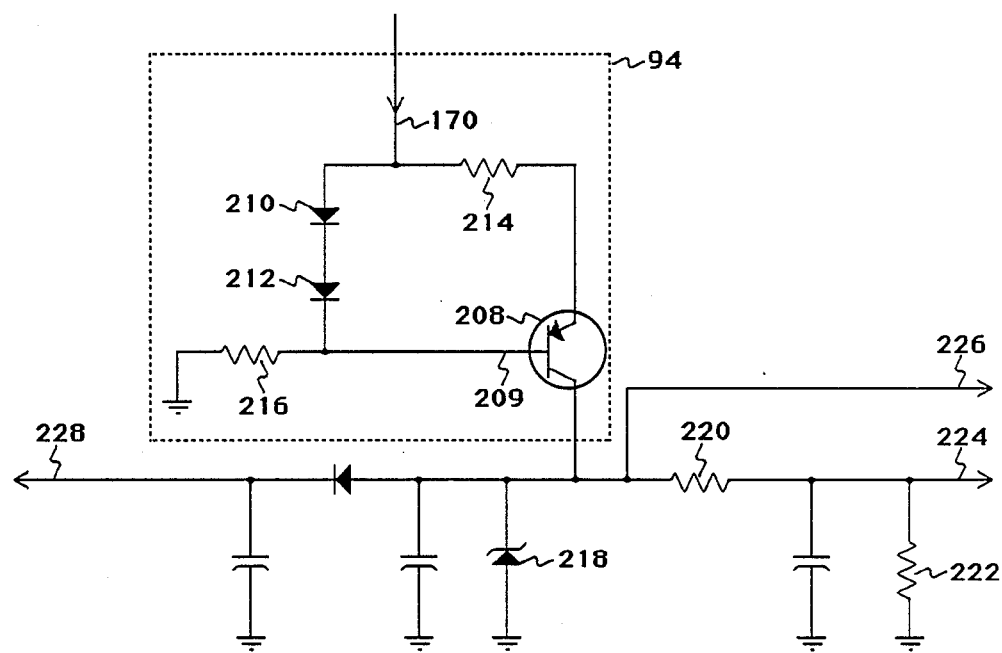
FIG. 5 is a schematic diagram of a voltage dividing circuit in the telephone set of FIGS. 1 and 2.

In FIG. 5, an additional power-supply/regulator circuit is shown, including current source 94 from FIG. 2. Current source 94 is implemented using pnp transistor 208, diodes 210 and 212, and resistors 214 and 216. Current source 94 receives "off-hook" power supply line 170 as an input; this line is coupled to the series combination of diodes 210 and 212, as well as to resistor 214. Diodes 210 and 212 establish a voltage drop of approximately 1.4-volts (two threshold voltages) between line 170 and the base terminal 209 of transistor 208. Resistor 214 serves to limit the amount of current drawn by transistor 208, thus regulating the current produced from the collector terminal of transistor 208. Zener diode 218 limits the voltage at the output of current source 94 to less than 4.3-volts. Resistors 220 and 222 make up a voltage divider circuit producing a voltage on line 224 of approximately one-half that at the output of current source 94. The half-level supply voltage on line 224 is used to bias op-amps in the receiver and transmitter amplifier circuits, as will be shown in FIGS. 11 and 13. Line 226, on the other hand, provides a full-level power supply to LED circuitry 100, voice switch IC 72, receiver circuitry (including receive gain unit 64, receive shaping circuit 66, and receive driver 68), and transmitter circuitry (including transmit shaping circuit 74, microphone preamp 80, and capsule switching unit 82). Furthermore, as shall be described in greater detail with reference to FIG. 15, line 224 provides supplementary power to voice chip 60 in the case that the line voltage normally used to power this chip falls too low. Lastly, as will be shown in FIG. 6, line 228 (shown in FIG. 5) carries power from current source 94 to flash timing unit 92.

CUSTOM LOGIC INTEGRATED CIRCUIT

Figure 6:
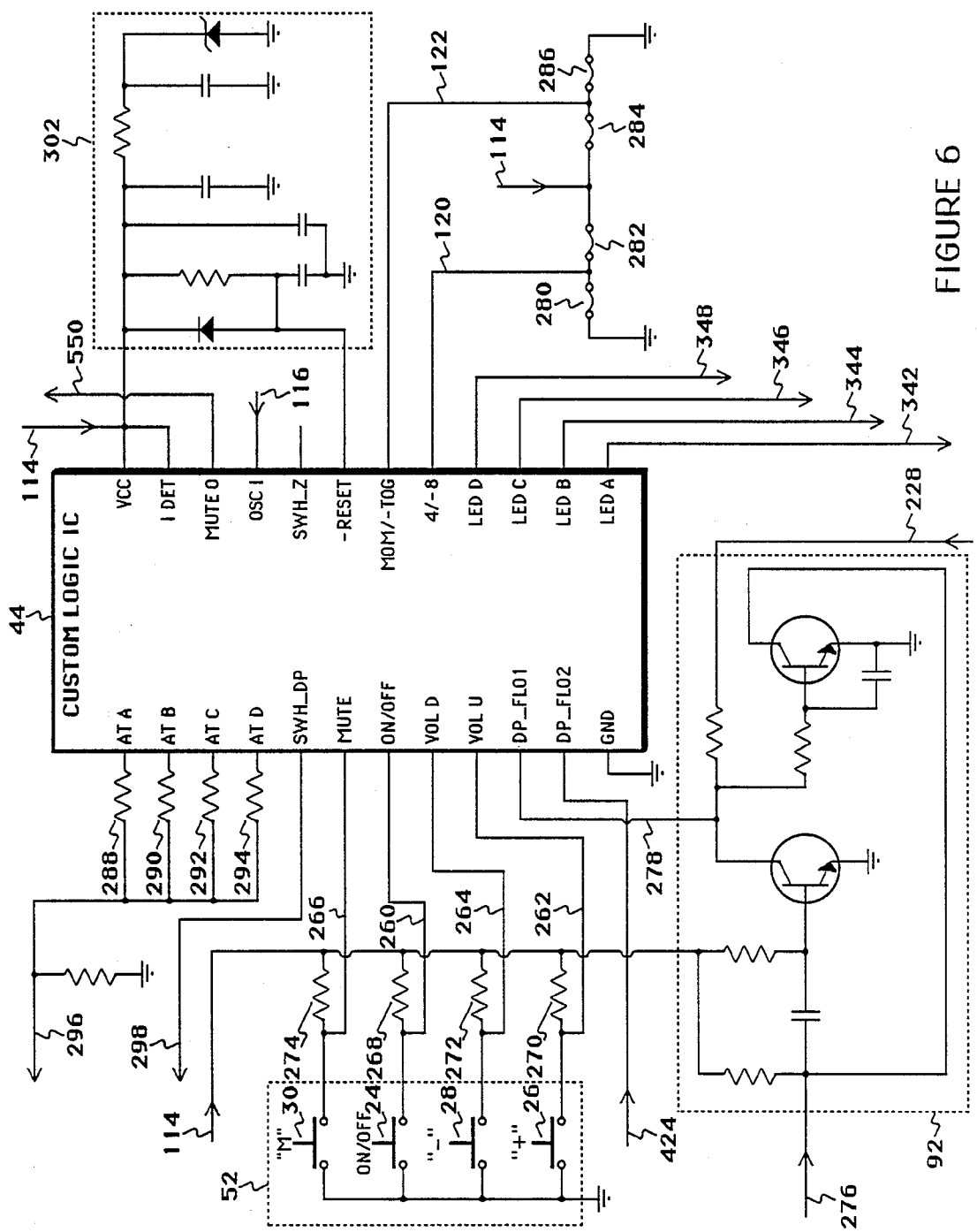
FIG. 6 is a schematic diagram showing connections to the custom integrated circuit chip in the telephone set of FIGS. 1 and 2.

Referring now to FIG. 6, a schematic diagram including custom logic integrated circuit chip 44 is shown. In one embodiment of the present invention, custom logic IC 44 is implemented as a narrow, 24-pin, dual-in-line package, using a standard 2-micron HCMOS technology Standard Cell application-specific integrated circuit (ASIC). In this embodiment, custom logic IC 44 is specified to operate at supply voltages ranging from 3.0-volts to 6.0-volts. Having the equivalent of approximately only six hundred logic gates in it, custom logic IC 44 consumes very little operating current. In particular, when clocked, logic IC 44 draws less than 5-microamps of current, and when static (unclocked) draws less than 1-microamp.

As with most conventional ASIC devices, custom logic IC 44 in FIG. 6 is a clocked device, requiring an oscillating signal to establish the timing of the sequential logic implemented therein. Because of the aforementioned low operating current requirements, an external oscillator, operating, in one embodiment, at a frequency of approximately 128-Hertz, is used for the custom IC 44. While an oscillator could be implemented within the ASIC itself, such as by cascading two inverter gates with feedback, and using a resistor/capacitor time-constant delay to determine the oscillation frequency, such an implementation is unacceptable for use with the present invention due to its high current consumption. An ASIC CMOS gate conventionally has a totem-pole output configuration consisting of a p-channel enhancement-mode FET stacked above an n-channel enhancement-mode FET. During switching, the input voltage to such a gate spends a finite amount of time in the transition region, at a level between supply and ground, where both transistors in the output stage are on at the same time. Thus, during this transition time, the voltage supply to the ASIC is effectively shorted to ground.

If the input voltage to an ASIC CMOS gate moves very quickly through this transition region, then the output stage only conducts for perhaps a few nanoseconds; the average current drawn in this case is accordingly very low. However, if the input voltage requires several hundred microseconds to make a transition, then the average current drawn in much higher. This is the case with cascaded inverters fed with the slow ramp signal of an RC circuit, as previously described.

Possible solutions to the problem of internally implemented ASIC oscillators include providing an external current source or using a large load resistance for the gate. Such features, however, are not currently available in ASICs. Alternately, open-drain buffers could be used with external pull-up resistors; in this case, timing components would be external to the ASIC, consuming several of the ASIC connecting pins.

Figure 7:
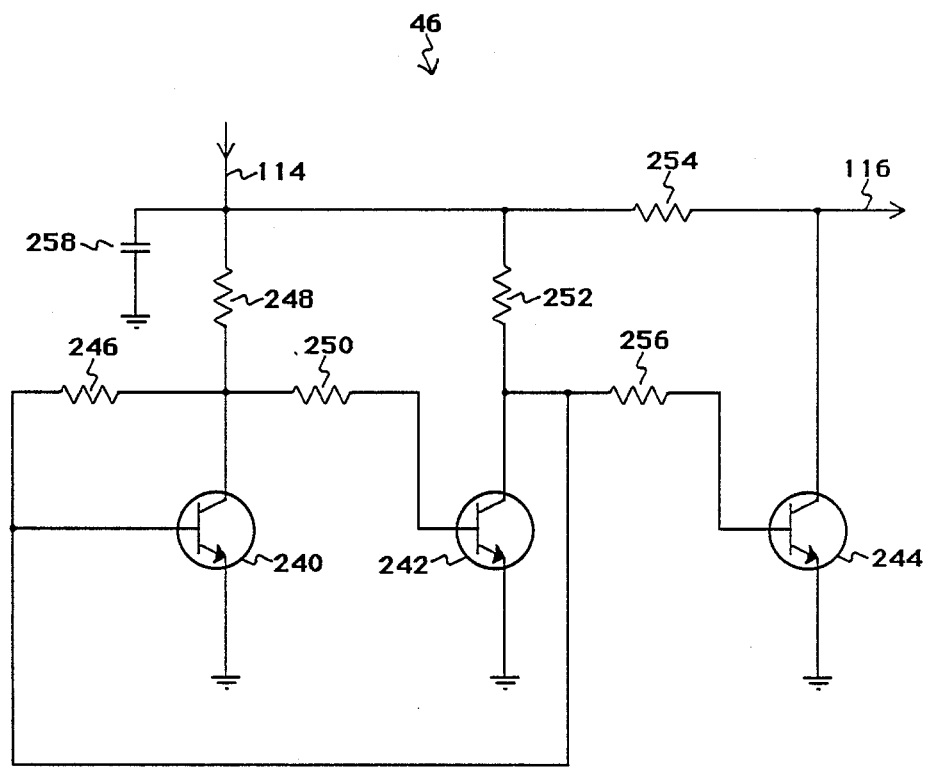
FIG. 7 is a schematic diagram of an oscillating signal generator in the telephone set of FIGS. 1 and 2.

Accordingly, an external oscillator circuit is prescribed for the present invention, such as the circuit 46 depicted in FIG. 1, which is shown in greater detail in FIG. 7. The oscillator circuit of FIG. 7 uses three inexpensive, discrete bipolar npn transistors 240, 242, and 244, six resistors 246, 248, 250, 252, 254, and 256, and one capacitor 258. In FIG. 7, circuit 46 receives power from the output 114 of low-current regulator 42. An oscillating output having a frequency of approximately 128-Hertz is produced on line 116, which is coupled to the OSC I input pin of custom logic IC 44, as shown in FIG. 6. The oscillator of FIG. 7 has combined rise and fall times of 110-microseconds, and draws 4.5-microamps of current.

Another implementation of an oscillator circuit, using discrete DMOS FETs (discrete versions of the transistors in CMOS logic chips) is also contemplated for use with the present invention. This circuit, substantially the same in design as that depicted in FIG. 7, has combined rise and fall times of only 80-microseconds, and draws only 3-microamps of current. Commercially available DMOS devices, however, are presently quite expensive.

Returning now to FIG. 6, the 128-Hertz oscillator from line 116 enters the OSC I input pin of custom logic IC 44, wherein it is fed into an inverting input buffer and then into a ripple-counter, both implemented in the ASIC logic. The ripple-counter has four outputs, which outputs carry oscillating signals having frequencies of 64-Hertz, 32-Hertz, 16-Hertz, and 8-Hertz. Additional logic implemented in ASIC 44 further divides the signal down to 4-Hertz, 2-Hertz, 1-Hertz and 0.5-Hertz signals, in a conventional manner, these signals being used variously within ASIC 44 to control the timing of functions performed therein. For example, the 0.5-Hertz signal is used to control the flashing of LEDs to indicate the activation of the transmit muting function, as will be hereinafter described with reference to FIG. 14.

As shown in FIG. 6, push button unit 52 from FIG. 2 includes four user-operable momentary-contact switches, including the aforementioned "on/off" button 24, "+" button 26, "−" button 28, and "M" button 30. These four buttons are coupled to input pins labelled "ON/OFF", "VOL U", "VOL D", and "MUTE" respectively, of custom logic IC 44, via input lines 260, 262, 264, and 266, respectively. Also coupled to lines 260, 262, 264, and 266 are one end of resistors 268, 270, 272, and 274, respectively, the other ends of which resistors are commonly coupled to output 114 of low-current regulator 42 shown in FIG. 4. Normally, therefore, lines 260, 262, 264, and 266 carry a logic high-level signal to the respective input pins of custom logic IC 44. When one of the push buttons 24, 26, 28, or 30 is depressed, however, the corresponding line 260, 262, 264, or 266 is momentarily coupled to ground through the action of the open-drain outputs of IC 44, thus grounding the corresponding IC input pin.

Manually operated push buttons often suffer from the undesirable effects of "bouncing"; that is, although a user may press the button firmly, the output from that button may momentarily oscillate between high and low levels before settling in to its eventual output. While this "bouncing" may be imperceptible in low-speed, analog circuits (such as a button for operating an indicator light, for example), digital circuits having high operational speeds may mistakenly interpret switch bouncing as deliberate signal transitions, often leading to anomalous and unpredictable circuit behavior.

Accordingly, the input signals on lines 260, 262, 264, and 266 are "de-bounced" before being used in the digital logic. This de-bouncing occurs internally to custom logic IC 44, by means of continuously-clocked shift registers implemented therein. Each of the signals is received in IC 44 in the first position of a separate four-position shift register. The value received in the first position of each shift register is propagated through the four positions of that shift register, moving one position with each clock cycle, the first positions being replaced with the current input signal values. When the outputs of all positions in a shift register are low (button depressed, no bounce), depression of the corresponding button is confirmed. If all positions of a shift register do not agree, this indicates that bouncing has occurred, and confirmation of the depression of the corresponding button is deferred until bouncing ceases. The de-bouncing shift registers are clocked with the 64-Hertz clock signal generated internally to IC 44 as previously described, this clock signal having an oscillating period of approximately 15.6-milliseconds. The de-bouncing "window" (the length of time during which a debouncing shift register input must be stable before a transition is confirmed) is slightly more than 60-milliseconds, which is a typical value used for pushbutton de-bouncing.

"R" button 32 on the front panel of the telephone of FIGS. 1 and 2 is not a de-bounced pushbutton. Instead, as shown in FIG. 3, "R" button 32 performs one of two possible functions, depending upon the position of EARTH/FLASH switch 90. With switch 90 in the FLASH position, depressing "R" button 32 causes RING line 104b to be coupled to EARTH line 104d, for as long as "R" button 32 remains depressed. As previously noted, this draws current from RING line 104b, indicating to certain ground-start switching systems that the line has been selected for use. With switch 90 in the FLASH position, however, the input, on line 276, of flash timing unit 92 is momentarily coupled to ground.

Referring now to FIG. 6, flash timing unit 92 is shown in greater detail. Recall from FIG. 5 that line 228 provides a full-voltage power supply to flash timing circuitry 92; further recall that line 114 is the output of low-current regulator 42. Flash timing unit 92 is a conventional one-shot pulse generator which drives a timed, logical high-level signal on its output line 278 when its input line 276 is momentarily grounded. Output line 278 is coupled to the DP_FL01 input to custom logic IC 44. Thus, when EARTH/FLASH switch 90 is in the FLASH position and "R" button 32 is depressed, line 276 is grounded, causing a high-level pulse of approximately 70-milliseconds duration to appear at the $DP_{13}$ FL01 input to IC 44. IC 44 responds to a high-level $DP_{13}$ FL01 input by opening hook-switch 58, momentarily breaking the current loop established between the telephone and the central switching station.

As previously noted with reference to FIG. 2, lines 120 and 122 are coupled directly to input pins of custom logic IC 44. In particular, line 120 is coupled to the 4/−8 input pin, while line 122 is coupled to the MOM/-TOG pin. Either high or low level logic signals are produced on lines 120 and 122 depending upon the configuration of "jumper" wires 280, 282, 284, and 286 shown in FIG. 6. In one embodiment, the configuration of these jumper wires is determined at the time of manufacture of the telephone, and jumpers 280, 282, 284, and 286 are not accessible to a user. It should be noted that in a different embodiment of the present invention, the signals on lines 120 and 122 could be generated from user-accessible switches, rather than from hardwired jumpers.

Notice that output line 114 of low-current regulator 42 is coupled between jumpers 282 and 284, and that one end each of jumpers 280 and 286 is coupled to ground. If jumper 282 is left in position, while jumper 280 is severed or removed, the "on-hook" power supply voltage will be received at the 4/−8 pin of IC 44; conversely, if jumper 280 is left in place while jumper 282 is removed, the 4/−8 pin of IC 44 is grounded. Similarly, for the MOM/−TOG pin, if jumper 284 remains in place with jumper 286 removed, MOM/−TOG receives the "on-hook" power supply voltage, and if jumper 284 is removed and jumper 286 left intact, MOM/−TOG becomes grounded.

Custom logic IC responds to the signal received at its 4/−8 pin as follows: a high-level signal on the 4/−8 input indicates that the receiver volume is adjustable over a 15- to 20-dB range in four steps, while a low-level signal indicates that the volume is adjustable over the 15- to 20-dB range in eight steps. In the case of MOM/−TOG, a high-level signal on this input pin selects the momentary mute mode of operation; a low-level signal selects the toggled mute mode of operation. Details of the operation of the mute circuit will be hereinafter described with reference to FIG. 12.

Custom logic IC pins AT A, AT B, AT C, and AT D are output pins which deliver high or low level logic signals to resistors 288, 290, 292, and 294, respectively. The opposite ends of each of these resistors are commonly coupled to line 296. Resistors 288, 290, 292, and 294 are gain control resistors used to adjust the volume of the receiver 70 as VOL U and VOL D push buttons are depressed. Operation of the volume control circuitry, including "+" and "−" pushbuttons 26 and 28, and IC outputs AT A, AT B, AT C, and AT D, and the receiver amplification circuitry will be hereinafter described in greater detail with reference to FIGS. 13 and 14.

The SWH_DP pin of custom logic IC 44 generates an output signal on line 298 which is received by the hook-switch control circuitry of FIG. 3. In particular, referring to FIG. 3, the SWH_DP signal on line 298 is coupled to the gate 166 of VMOS transistor 136, via current-limiting resistor 300. Thus, as previously described, the voltage level of the SWH_DP output causes the hook-switch switching transistor 134 to open or close. In particular, when SWH_DP is at a logical high level, transistors 136 and 134 are turned on, (hook-switch 58 is "closed") and the telephone is in an "off-hook" condition; when SWH_DP is at a logical low level, transistors 136 and 134 are turned off, (hook-switch 58 is "open") and the telephone is in an "on-hook" condition. Resistor 300 functions to limit the current drawn by the electronic hook-switch 58 from custom logic IC 44. At any given time, the status of the SWH_DP signal on line 298 is determined by custom logic IC 44, this determination being based on the interpretation of various incoming signals to IC 44 reflecting the operational status of the telephone of FIGS. 1 and 2.

The −RESET pin to custom logic IC 44 receives an input signal which, when at a low level, does the following: First, it resets hook-switch 58 to an "on-hook" condition by forcing the SWH_DP output signal to be at a low level; also, a low level −RESET signal causes IC 44 to force the receiver volume control to a nominal level, near minimum, by activating the appropriate combination of output signals AT A, AT B, AT C, and AT D. Additionally, if the toggled mute function is activated, a low level −RESET signal deactivates the mute function, by forcing the MUTE O output of IC 44 low, and resets the aforementioned debouncing shift registers implemented in IC 44.

The −RESET input signal to custom logic IC 44 is generated by the circuit designated generally as 302 in FIG. 6. Circuit 302 is a conventional resistor/capacitor network and signal diode combination which is coupled between the −RESET pin of IC 44, the output 114 of low current regulator 42, and ground. Circuit 302 functions to keep the −RESET signal low for a short period of time when power is first applied to IC 44. After this time, the −RESET signal rises to a high value, where it stays until power is removed from IC 44. In this way, the aforementioned functions initiated by a low-level −RESET input occur automatically each time power is applied to IC 44.

Figure 8:
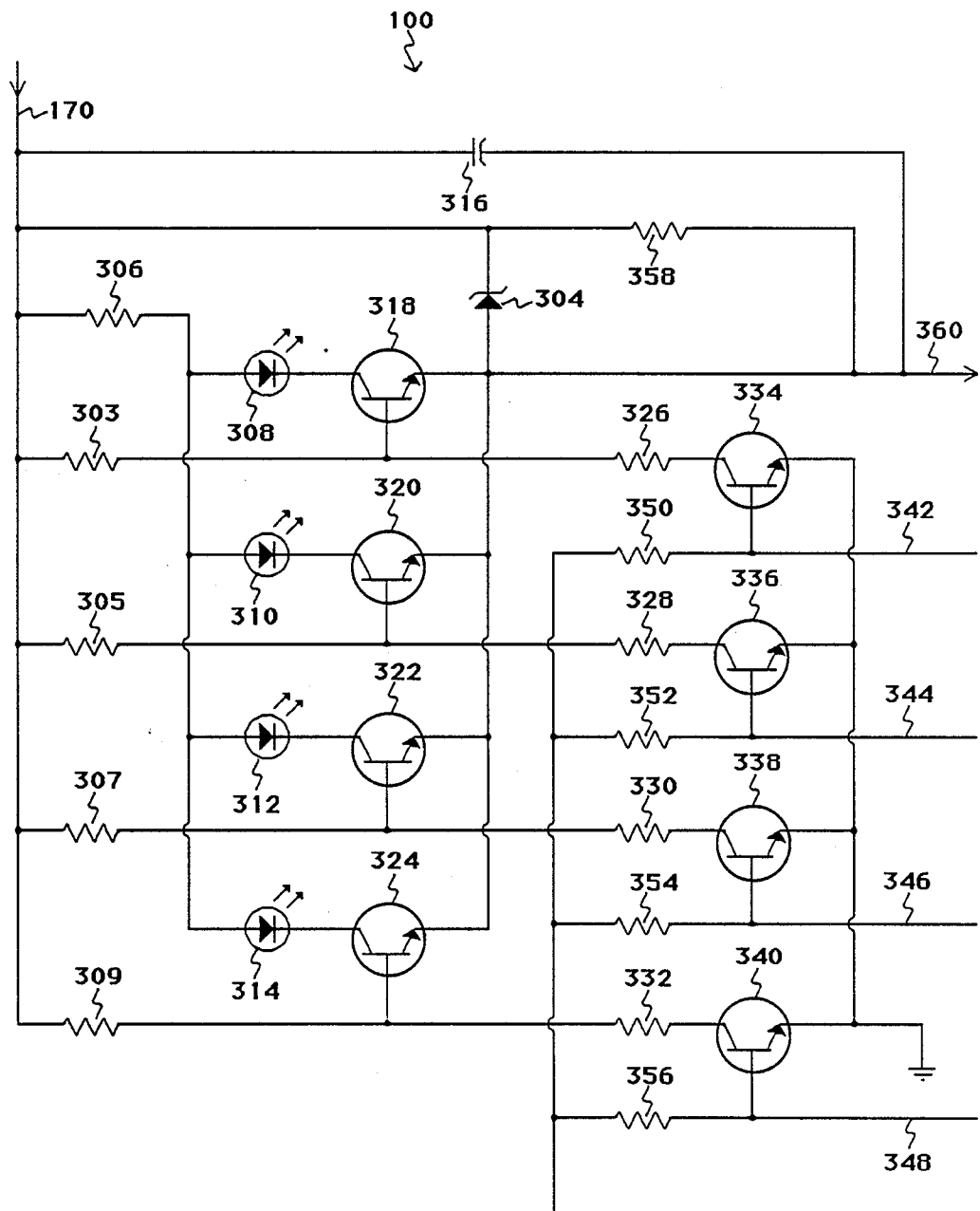
FIG. 8 is a schematic diagram of the LED driving circuitry in the telephone set of FIGS. 1 and 2.

Turning now to FIG. 8, LED indicator circuitry 100 from FIG. 2 is shown in detail. Recall from FIG. 6 that custom logic IC 44 provides four open-drain outputs lines, 342, 344, 346, and 348, for controlling four LEDs in LED bank 34, which LEDs provide a visual indication of the volume level of the telephone of the present invention. Zener diode 304 functions to limit the voltage drop across the LED circuitry. Resistor 306 limits the amount of current feeding LEDs 308, 310, 312, and 314. Capacitor 316 provides an AC bypass around the LED circuitry. Associated with LEDs 308, 310, 312, and 314 are driving transistors 318, 320, 322, and 324, respectively. The base terminals of transistors 318, 320, 322, and 324 are coupled, via respective resistors 326, 328, 330, and 332, to the collector terminals of bipolar npn control transistors 334, 336, 338, and 340, respectively. The emitters of transistors 334, 336, 338, and 340 are commonly coupled to ground. The base terminals of control transistors 334, 336, 338, and 340 are coupled to the LED A, LED B, LED C, and LED D control signals from custom logic IC 44, on lines 342, 344, 346, and 348, respectively. Additionally, the base terminals of control transistors 334, 336, 338, and 340 are commonly coupled to line 226, via resistors 350, 352, 354, and 356, respectively. Recall from FIG. 5 that line 226 provides a half-level power supply.

Operation of the LED circuitry 100 proceeds as follows: When custom logic IC 44 determines, based on the status of the volume control and mute circuitry hereinafter described, that certain of the LEDs are to be lighted, IC 44 activates the appropriate open-drain outputs LED A, LED B, LED C or LED D, effectively coupling the respective LED control lines 342, 344, 346 or 348 to ground. For example, if LED 308 is to be lighted, line 342 is coupled to ground through the LED A output buffer. This allows current to flow from supply line 226 through resistor 350, and then to ground via line 342. Current through resistor 350 turns on control transistor 334, allowing current to be conducted through resistors 326 and 303. Current through the voltage divider formed from resistors 326 and 303 increases the voltage at the base terminal of driver transistor 318. When transistor 318 is on, current flows through resistor 306 and LED 308, lighting LED 308. Operation of LEDs 320, 322, and 324 proceeds in a corresponding manner.

Line 170 is additionally fed through resistor 358 to output line 360. As will be hereinafter described with reference to FIG. 15, line 360 is received by Wheatstone balancing circuit 62, and by voice IC 60. To Wheatstone bridge circuit 62, line 360 carries the incoming voice signal; to voice IC 60, line 360 carries DC power. Resistor 358 functions to prevent the LED circuitry 100 from drawing too much "off-hook" current, consequently depriving voice IC 60 of operational power, in the case that the loop current provided on the incoming transmission lines drops. In this way, resistor 358 sacrifices the brightness of the LEDs in order to keep voice chip 60 operational in the event that line current is reduced. Such a trade-off is acceptable, since operation of the LEDs is not as functionally critical as operation of voice chip 60.

RINGER CIRCUITRY

Figure 9:
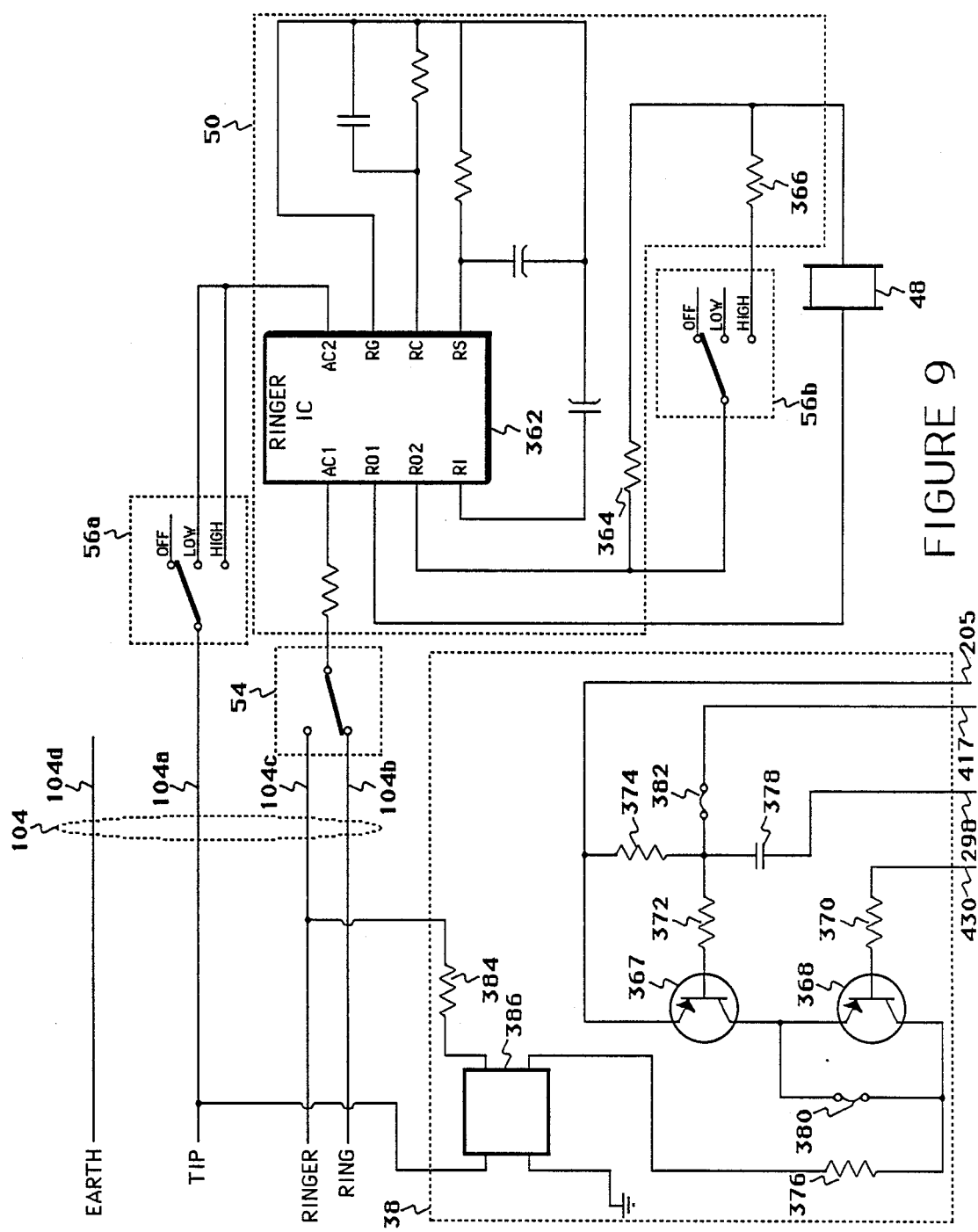
FIG. 9 is a schematic diagram of the ringer circuitry and bell-tap suppression circuitry in the telephone set of FIGS. 1 and 2.

In FIG. 9, ringer circuit 50, 2/3 WIRE switch 54, ringer loudness switch 56, ringer 48, and bell tap suppression circuitry 38 from FIG. 2 are shown in detail. A ringer integrated circuit chip 362, which in one embodiment of the present invention may be a commercially-available AT&T CSW1A ringer controller or its equivalent, receives signals from 2/3 WIRE switch 54 and RINGER LOUDNESS switch 56. As previously indicated, switch 54 is a two-position switch configured such that in a first position, switch 54 couples RINGER line 104c of a three-wire system to the AC1 input of ringer IC 362, while in a second position, switch 54 couples couples RING line 104b of a two-wire system to input AC1 of IC 362.

RINGER LOUDNESS switch 56 is a dual three-position switch, having two independent, three-position switching mechanisms denoted as 56a and 56b which are actuated simultaneously as a single switch. Switch 56 has three positions designated OFF, LOW, and HIGH. Setting switch 56 to one of the OFF, LOW, or HIGH positions causes both switches 56a and 56b to make the corresponding connections shown in FIG. 9. Thus, with switch 56 in the OFF position, ringer IC input AC2 receives no input signal, since no connection is made with the OFF terminal of switch 56a. In either the LOW or HIGH positions, however, switch 56a causes TIP line 104a to be coupled via line 72, to the AC2 input.

With continued reference to FIG. 9, resistor 364 and ringer 48 are connected in series between the R01 and R02 pins of ringer IC 362, with the series combination of switch 56b and resistor 366 in parallel with resistor 364. With switch 56 in the OFF or LOW positions, only resistor 364 and ringer 48 are in the path between R01 and R02. In the HIGH position, however, switch 56, specifically switch 56b, causes resistor 366 to be coupled in parallel with resistor 364, with the parallel combination of resistors 364 and 366 in series with ringer 48. In this way, the effective resistance between the R01 and R02 pins of IC 362 is reduced when switch 56b is in the HIGH position. This allows more current to pass through ringer 48, causing it to ring more loudly. Ringer 48 may be a piezo-electric device, or the like, commonly used for telephone ringer applications.

Incoming AC ringing signals are received at the AC1 and AC2 inputs of ringer IC 362. In response to an AC ringing signal on these inputs, IC 362 drives an oscillating signal between its R01 and R02 pins, causing piezoelectric ringer 48 to produce and audible tone.

Bell-tap suppression circuitry 38 prevents ringer 48 from being activated by voltage transients appearing on TIP line 104a or RING line 104b during pulse dialing. As shown in FIG. 9, bell-tap suppression circuit 38 includes bipolar pnp transistors 367 and 368, resistors 370, 372, 374, 376 and 384, capacitor 378, and jumper wires 380 and 382. Bell-tap suppression circuitry further includes an optically coupled isolator (or equivalent) device 386. Jumper wires 380 and 382 are included to allow for two different implementations of the bell-tap circuitry, depending upon the type of device 386. In a first implementation, device 386 is an LCA110 FET optically coupled isolator or the like, while in a second, device 386 is an MCP3023 triode AC switch (triac) or the like.

In the first embodiment, jumper 380, capacitor 378, and resistor 374 are omitted from circuit 38. As shown in FIG. 9, the base terminal of transistor 367 receives the signal from line 417 via jumper 382 and resistor 372. The signal on line 417 is produced at the −HS input of dialer IC 86, as will be hereinafter described with reference to FIG. 10; −HS has a logical low-level when the telephone is in an "off-hook" state, and high when the telephone is in an "on-hook" state. The base terminal of transistor 68 receives the signal from line 430, via resistor 370. The signal on line 430 is taken from the −MUTE output of −dialer IC 86, as will be shown in FIG. 10; −MUTE has a logical low-level during pulse dialing and when the telephone is "on-hook", and a logical high-level at all other times. The emitter terminal of transistor 367 receives a continuous, positive power supply signal from the positive terminal of super-cap 98, on line 205.

In the first embodiment of bell-tap suppression circuit 38, therefore, ringer 48 is prevented from responding to dialing pulse transients on TIP line 104a and RING line 104b in the following way: During pulse dialing, the phone must be in an "off-hook" state, so the −HS signal on line 417 is at a low level, allowing transistor 367 to conduct. Likewise, during pulse dialing, the −MUTE signal on line 430 is low, allowing transistor 368 to conduct. With both transistors 367 and 368 conductive, current flows through resistor 376 to device 386, which in this first embodiment is an optically coupled isolator. The current through resistor 376 activates device 386, thus coupling TIP line 104a with RING line 104b via resistor 384. Resistor 384 has a relatively low-impedance, and thus large voltage transients generated during pulse dialing are easily conducted through device 386, and are diverted away from ringer IC 362.

In a second embodiment of circuit 38, device 386 is a triode AC switch or triac, which responds to a positive input voltage in much the same way as an optically coupled isolator. In the second embodiment, jumper 382, transistor 368, and resistor 370 are omitted from circuit 38. In this case, the SWH_DP signal on line 298 is received at the base terminal of transistor 366, via resistor 372; as in the first embodiment, continuous power from super-cap 98 is provided to the emitter terminal of transistor 366, on line 205. Recall that the SWH_DP signal is an output of custom logic IC 44 which has a logical high-level when the telephone is "off-hook", and a logical low-level when the telephone is "on-hook". When the telephone is "off-hook", therefore, capacitor 378 is charged, rendering transistor 366 conductive. Current is conducted through resistor 376, activating triac 386. When triac 386 is activated, TIP line 104a and RING line 104b are coupled by low-impedance resistor 384, diverting dialing pulses away from ringer IC 362.

DIALING CIRCUITRY

Figure 10:
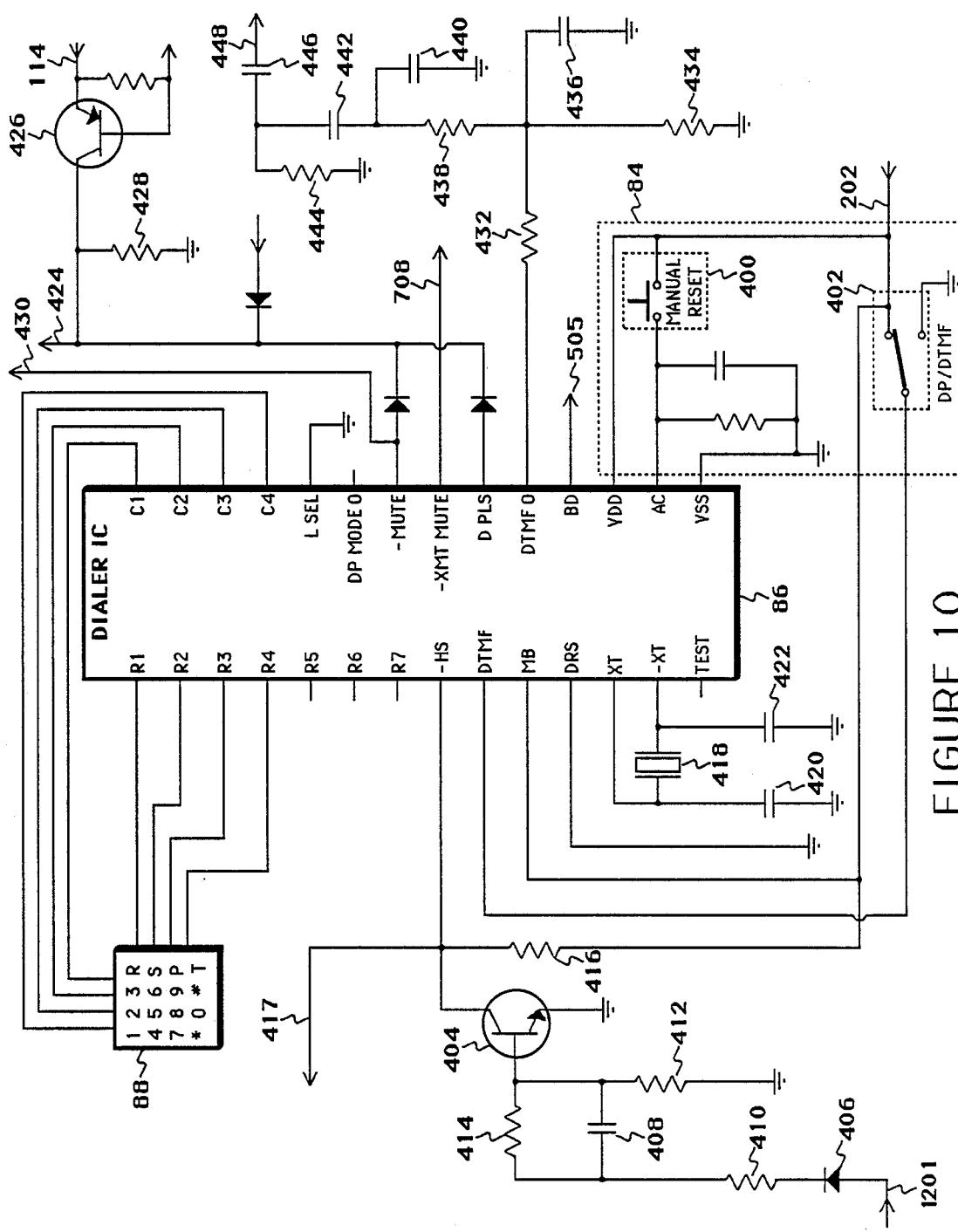
FIG. 10 is a schematic diagram showing connections to the dialer integrated circuit chip and dialer logic unit in the telephone set of FIGS. 1 and 2.

Turning now to FIG. 10, dialing circuitry including dialer IC 86 and dialing logic 84 is shown in detail. In one embodiment of the present invention, dialer IC 86 is an MSM6052-01RS or MSM6052-20RS Tone/Pulse Repertory Dialer manufactured and sold by OKI Electronics of America, Inc., Fort Lauderdale, Florida, or the like. Dialer IC 86 receives inputs from alphanumeric keypad unit 88 at input pins labelled R1 through R4 and C1 through C4, as shown in FIG. 10. In a conventional manner for decoding the output of a pushbutton matrix, each of the sixteen buttons in unit 88 is identified by a unique combination of row and column signals R1-R4 and C1-C4, respectively. Thus, for example, depressing the "1" key on unit 88 causes a high-level signal on lines R1 and C1, indicating t IC 86 that the button in row one, column one of unit 88 has been depressed.

Since dialer IC 86 includes memory storage facilities for storing up to thirty numbers, IC 86 must, as previously noted, be powered at all times in order to retain this memory. Accordingly, dialing logic unit 84 receives a supply voltage from the output 202 of super-cap 98. Super-cap 98 functions as a battery during periods when the telephone of the present invention is not in use, in an "on-hook" condition. Super-cap output 202 is coupled to the Vdd power supply input pin of IC 86, as shown in FIG. 10. In addition, super-cap output 202 is coupled to one side of a MANUAL RESET pushbutton 400 included in dialing logic unit 84. The output of pushbutton 400 is coupled to the AC input of dialer IC 86, so that when MANUAL RESET pushbutton 400 is depressed, a high-level logic signal is delivered to the AC input pin of IC 86. A high-level signal on the AC pin causes dialer IC 86 to be reset, in the event of a malfunction.

Super-cap output line 202 may also be selectively coupled to the DTMF input of dialer IC 86, by means of DP/DTMF switch 402. In a first position, DP/DTMF switch 402 couples the DTMF input of IC 86 to ground, indicating that IC 86 should initiate outgoing calls by repeatedly opening and closing the current loop of TIP line 104a and RING line 104b; in a second position, switch 402 couples the DTMF pin to the logical high-level signal from line 202, indicating that IC 86 should initiate outgoing calls by generating conventional "dual-tone multifrequency" dialing tones. Switch 402 is disposed on housing 2 and is accessible to a user, allowing selection of either pulse dialing (DP mode) or dual-tone multifrequency dialing (DTMF mode).

Transistor 404, diode 406, capacitor 408, and resistors 410, 412 and 414 create a logic signal received at the −HS input of dialer IC 86 for preventing pulse-dialing line interrupts from disabling IC 86 during pulse dialing. Output signal 201 from high-current regulator 96 provides "off-hook" power to the base terminal of transistor 404 via diode 406, and resistors 410 and 414. Super-cap output line 202 is coupled to the collector terminal of transistor 404, via resistor 416. When hook switch 58 is closed ("off-hook"), therefore, the −HS input of dialer IC 86 is held low, via the collector-to-emitter current path of transistor 404. When hook-switch 58 is opened, however, power is no longer provided on line 201 from high-current regulator 96. Charge stored on capacitor 408 while line 201 is high allows transistor 404 to remain on for a short period of time after line 201 goes low. After this short time, however, charge from capacitor 408 is consumed, and transistor 404 turns off.

When transistor 404 turns off, the −HS input to dialer IC 86 is pulled high by super-cap output line 202 through resistor 416. When the −HS input is high, dialer IC 86 enters an on-hook stand-by or "sleeping" mode, in which it is not active and consumes less power. When −HS is low, however, IC 86 is activated. The signal on the −HS input pin of IC 86 is also carried, via line 417, to bell tap suppression circuitry 38, as noted above with reference to FIG. 9.

The delay between line 201 going low and transistor 404 turning off prevents dialer IC 86 from being disabled during pulse dialing. Recall that dialing pulses are generated by repeatedly opening and closing hook-switch 58. Thus, when dial pulses are being generated, "off-hook" power on line 201 is repeatedly interrupted. If transistor 404 turned off immediately when line 201 went low, dialer IC 86 would repeatedly enter its stand-by state, preventing proper operation during dialing. Charge stored on capacitor 408 ensures that transistor 404 remains on while dialing pulses are being generated.

Ceramic resonator 418 is coupled between the XT and −XT pins of dialer IC 86, providing a reference frequency for an internal 3.58-mHz oscillator in dialer IC 86, the internal oscillator being used to generate DTMF dialing tones in a conventional manner on the DTMF 0 output pin of IC 86. Capacitors 420 and 422 are coupled on either side of oscillator 418, serving as a feedback circuit for oscillator 418, in a conventional manner.

If the telephone of FIGS. 1 and 2 is configured to operate in dialing pulse mode, (i.e. if DP/DTMF switch 402 is in the DP position), dialer IC 86 generates dialing pulses on TIP line 104a and RING line 104b, by repeatedly opening and closing hook-switch 58 ("making and breaking" the current loop). In order to generate a dialing pulse, IC 86 generates a low-going pulse on line 424, which line is received at the DP_FL02 input of custom logic IC 44. The signal on line 424 is normally at a logical high level, due to the action of transistor 426, whose emitter terminal receives on-hook power from output 114 of low-current regulator 42. On-hook power from line 114 forward-biases transistor 426, so that current flows from its collector terminal. Collector current from transistor 426 flows through resistor 428, creating a logical high-level voltage on line 424. When dialer IC 86 generates a low pulse at its D PLS output pin, however, the signal on line 424 goes low.

A low-going pulse from line 424 is received by the DP_FL02 input of custom logic IC 44, causing IC 44 to momentarily open hook-switch 58, by generating a low-going pulse on its SWK_DP output pin. Recall that the SWK_DP output of IC 44 is coupled, via line 298, to the control terminal of hook-switch 58. Consequently, each momentary low-going pulse on line 424 causes hook-switch 58 to be opened momentarily, causing a single dialing pulse to be generated on TIP and RING lines 104a and 104b. Dialer IC 86 may thus generate a series of successive low-going pulses at its $D_{13}$ PLS output in order to generate dialing pulses which identify to the central switching station the identity of the called phone.

The dialer IC 86 pulls its −MUTE output to a logical low level during pulse dialing. As previously noted with reference to FIG. 9, the −MUTE signal is coupled via line 430 to bell-tap suppression circuitry 38, so that this circuitry is activated by the low-level −MUTE signal during pulse dialing. In addition, as shown in FIG. 10, the −MUTE output and D PLS output of IC 86, and the SWH₁₃ Z output of IC 44 (line 117) are diode OR-ed to produce a signal on line 424 which has a logical low level only during pulse dialing "breaks". This signal is conducted on line 424 to the DP_FL02 input of IC 44. The signal applied to the DP_FL02 input is used by custom logic IC 44 to determine the state of hook-switch 58; in particular, the DP_FL02 input is used to control the hook-switch during the process of pulse dialing. Each pulse in a pulse dialing sequence is initiated with the dialer IC 86 driving a low-level pulse on the DP_FL02 input of IC 44. These low-level pulses are produced on line 424 from the D_PLS and −MUTE outputs of IC 86. Custom logic IC 44 responds to low-level pulses on the DP_FL02 input by momentarily opening hook-switch 58, using the SWH_DP output signal previously described with reference to FIG. 4 and FIG. 6. The momentary opening of hook-switch 58 creates a dialing pulse on TIP line 104a and RING line 104b.

If the telephone of FIGS. 1 and 2 is configured to operate in DTMF dialing tone mode, (i.e. DP/DTMF switch is in the DTMF position), dialer IC 86 initiates outgoing calls by generating dialing tones on its DTMF O output pin. As previously noted, IC 86 generates standard dualtone multifrequency dialing tones using an internal 3.58 mHz oscillator, using external ceramic oscillator 418 as a reference frequency. Resistors 432, 434, 438, and 444, and capacitors 436, 440, 442, and 446 comprise a conventional filtering circuit applied to the dialing tone DTMF O output of dialer IC 86. The filtered dialing tone signal is then carried, via line 448, to the DTMF input of voice chip 60, which presents these tones to the transmission lines 104, as will be hereinafter described in detail with reference to FIG. 15.

In accordance with another aspect of the present invention, the telephone of FIGS. 1 and 2 is capable of storing up to thirty telephone numbers which may be recalled for "memory dialing". In addition, the telephone set of FIG. 1 and 2 is capable of remembering and redialing the last number dialed on the telephone set of FIGS. 1 and 2. The memory dialing functions and last number redial feature of the telephone are standard features implemented wholly within dialer IC 86.

Recall from FIG. 1 that a button labelled "S" is included in alphanumeric keypad unit 88. According to one embodiment of the invention, depressing the "S" button once, followed by two dialer numbers (also in keypad 88) will cause the number stored in the dialer memory location specified by the two dialer numbers will be dialed. The two dialer numbers must be in the range from "0 1" through "2 9", corresponding to the thirty memory locations in dialer IC 86. Each of the thirty memory locations is capable of storing one telephone number having at most 32 digits each; furthermore, the maximum number of digits among all stored numbers in dialer IC 86 must, according to one embodiment, be less than five hundred.

Storing numbers in the memory of dialer IC 86 involves depressing the "P" button in keypad unit 88, followed by the dialing sequence to be stored.

Numbers which are dialed by pressing the "S" button followed by two dialing digits are dialed automatically by dialer IC 86. In the case of DTMF dialing, each automatically generated tone pair is present on the TIP/RING line for a minimum amount of time (typically on the order of 50-milliseconds or so), with a minimum interdigit interval of 50-milliseconds or so. Occasionally, however, it is necessary for a longer interdigit delay to be introduced in a dialing sequence, such as to allow for response times of central office switching equipment. Accordingly, depressing the "B" button in keypad unit 88 in place of a numeric digit when storing a telephone number as described above causes a four-second pause to be included in the dialing sequence.

Another feature commonly provided in electronic telephones is a "last number redial" capability. In the telephone of FIGS. 1 and 2, depressing the "S" button in keypad 88 twice in rapid succession causes the last number dialed on the phone to be redialed automatically.

As previously noted, the method of dialing used by the phone of FIGS. 1 and 2 (either dialing pulses or DTMF dialing tones) is determined by the position of DP/DTMF switch 402, providing an input to DTMF input of dialer IC 86. When the telephone is in the pulse dialing mode (DP mode), the telephone may be temporarily switched to dialing tone (DTMF) mode, by depressing the "T" button in keypad 88. Depressing the "T" button switches the telephone to DTMF tone dialing for the duration of the current call only (until the phone is put "on-hook"). When subsequently taken "off-hook", the telephone will resume operation in pulse dialing mode (assuming the DP/DTMF switch remains in the DP position). This feature is called "tone override", and like the memory dialing and last number redial features, is implemented within dialer IC 86.

During both tone dialing and pulse dialing, dialer IC 86 generates various tone sequences from its BD output which may be used to provide an audible indication of the operation of dialer IC 86. As will be shown with reference to FIG. 13, the BD output of dialer IC 86 is coupled, via line 505, to the input of driver amplifier 68, so that tones generated by dialer IC 86 can be heard by the user. In particular, for each valid key input from keypad 88, dialer IC generates a 2-kHz, 32-millisecond "operation confirmation sound" on its BD output. When the storing or clearing of a dialing sequence in dialer memory has been completed, IC 86 generates a 2-kHz, 0.5-second "storing confirmation sound" on its BD output. For illegal key inputs, attempts to store a dialing sequence longer than 32 digits, and attempts to store sequences when dialer memory is full, IC 86 generates a 3.5-kHz, 288-millisecond "alarm sound" on its BD input. Several other "alarm sounds", comprising various combinations of 1-kHz, 2-kHz and 3.5-kHz tones are generated in response to certain user input errors. A complete description of this and other standard features of the OKI Tone/Pulse Repertory Dialer can be found in the data sheet for this device, published by OKI Electronics of America, Inc., incorporated herein by reference.

With continued reference to FIG. 10, a circuit comprising transistor 426, resistors 428, 429, 431, capacitor 433, and diode 435 is coupled to line 424. This circuit allows the telephone to be taken "off hook" when super-cap 98 is partially or completely discharged. Recall from the description of FIG. 6 that in order for hook-switch 58 to respond to the pressing of on/off button 24, the DP_FL02 input to Custom Logic IC 44 must have a logical high level. Normally, this signal is controlled by the diode OR-ed −MUTE, D PLS, and SWH₁₂ Z signals coupled to line 424, as previously described. However, if supercap 98 is uncharged, dialer IC receives no power supply, and the −MUTE and D PLS signals will be low; furthermore, when on/off button 24 is pressed, the SWH—Z output signal from IC 44 on line 117 is also low.

Transistor 426 acts to hold the DP—FL02 input of custom IC 44 high until super-cap 98 is charged sufficiently to turn on the dialer, which can then take control of the DP—FL02 input to IC 44. Notice that the emitter terminal of transistor 426 receives un-switch line power from low-current regulator 42 via line 114. When super-cap 98 is partially or completely discharged, transistor 426 turns on, due to the emitter-to-base voltage drop. Resistors 429 and 431 act as a voltage divider to set the threshold at which transistor 426 turns off, leaving dialer IC 86 in control of the $DP_{13}$ FL02 input to IC 44. Capacitor 433 prevents transients from turning on transistor 426 when super-cap 98 is charged. Diode 435 serves to minimize leakage of charge from super-cap 98.

TRANSMITTER AMPLIFIER

Figure 11:
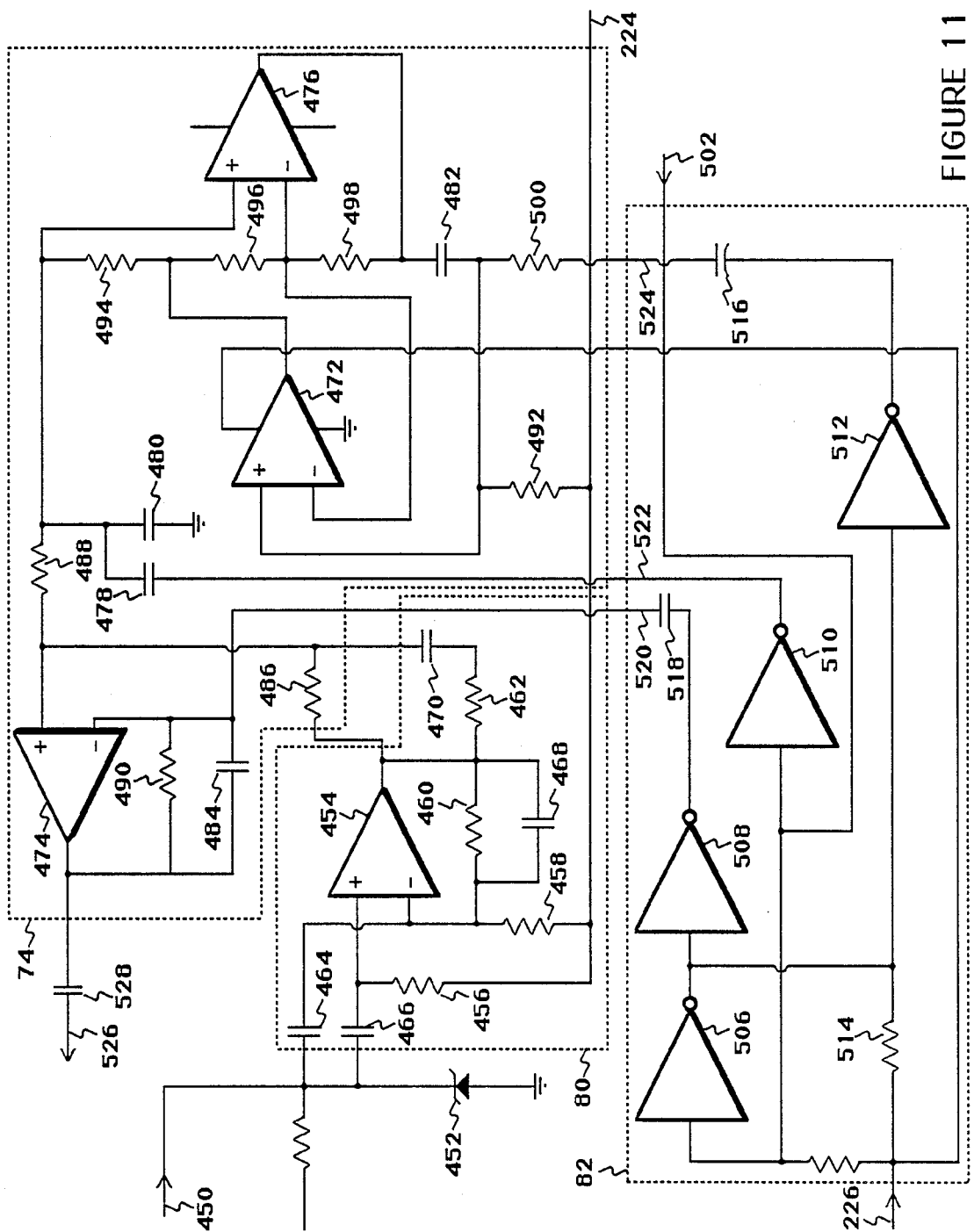
FIG. 11 is a schematic diagram of the transmit amplification circuitry of the telephone set of FIGS. 1 and 2.

In FIG. 11, a schematic diagram of transmitter amplification circuitry is shown. In accordance with the present embodiment of the invention, the telephone of FIGS. 1 and 2 is equipped with an electret-type microphone 78 housed within the capsule of user-worn headset 102. An electret microphone is preferred due to its light weight and low cost, although other types of microphone transducers are considered viable within the scope of the present invention. In an electret microphone transducer, a vibrating diaphragm constitutes one plate of a capacitor; the charge stored on the capacitor varies in response to fluctuations in sound impinging upon the vibrating diaphragm, the varying stored charge appearing as voltage variations (referenced to ground) at the microphone's output. In FIG. 11, the output of microphone 78 is denoted as 450. Zener diode 452 prevents the input signal to the transmit amplification circuitry of FIG. 11 from exceeding a maximum level of approximately 12-volts.

The transmit voice signal produced on microphone output line 450 is amplified by microphone preamp 80 comprising operational amplifier (op-amp) 454, resistors 456, 458, 460, and 462, and capacitors 464, 466, 468, and 470. In accordance with one feature of the present invention, microphone preamp 80 can be configured to accept either low or high impedance inputs, corresponding to standard "A"-type or "E"-type microphones. If a low-impedance "A"-type circuit is to be used, capacitor 466 and resistor 458 are omitted; if a high-impedance "E"-type circuit is desired, capacitor 464 is omitted. Thus, for an "A"-type circuit, the transmit voice signal on line 450 enters the inverting ("−") input of op-amp 454, while a reference voltage from line 224 follows resistor 456 into the non-inverting ("+") input of op-amp 454. On the other hand, for an "E"-type circuit, the incoming voice signal on line 450 is coupled, via capacitor 466, to the non-inverting input of op-amp 454, while a reference voltage is provided to the inverting input via resistor 458.

After amplification in preamp 80, the voice signal is fed to transmit shaping circuit 74, which functions to compensate for the imperfect frequency response of the headset capsule microphone. Transmit shaping circuit 74 consists of op-amps 472, 474, and 476, capacitors 478, 480, 482, and 484, and resistors 486, 488, 490, 492, 494, 496, 498, and 500. A tuned resonant circuit comprising capacitors 478 and 480, and a synthetic inductor formed from op-amps 472 and 476 compensates for the frequency response of the capsule microphone at the midpoint of the voltage divider formed from resistors 486 and 488. Resistors 492, 494, 496, 498, 500, and capacitor 482 determine the value of the inductance.

The synthetic inductor formed from op-amps 472 and 476 is a form of a Generalized Impedance Converter circuit which transforms the impedance of capacitor 482 into an inductance, for the purpose of frequency response shaping. As can be appreciated by one of ordinary skill in the circuit design art, the synthetic inductor of FIG. 11 has the advantage that high inductance values may be achieved using ordinary capacitive and resistive components.

Further in accordance with the present invention, the frequency response compensation is adjustable to accommodate capsules having various frequency response characteristics. To this end, capsule switching circuit 82, shown in FIG. 2, and shown in greater detail in FIG. 11, receives capsule transmitter ID line 502, which permits transmit shaping circuitry 74 to change the response compensation for different capsules. Capsule switching circuit 82 comprises an array of open-drain gate buffers 506, 508, 510, and 512, resistor 514, and capacitors 516 and 518. Outputs 520, 522, and 524 of capsule switching circuit 82 are altered according to whether the capsule transmitter ID input line 502 is grounded or not. Line 502 is coupled to one of the six or eight pins in the headset capsule connecting jack disposed on housing 2 of the telephone of the present invention.

Figure 12:
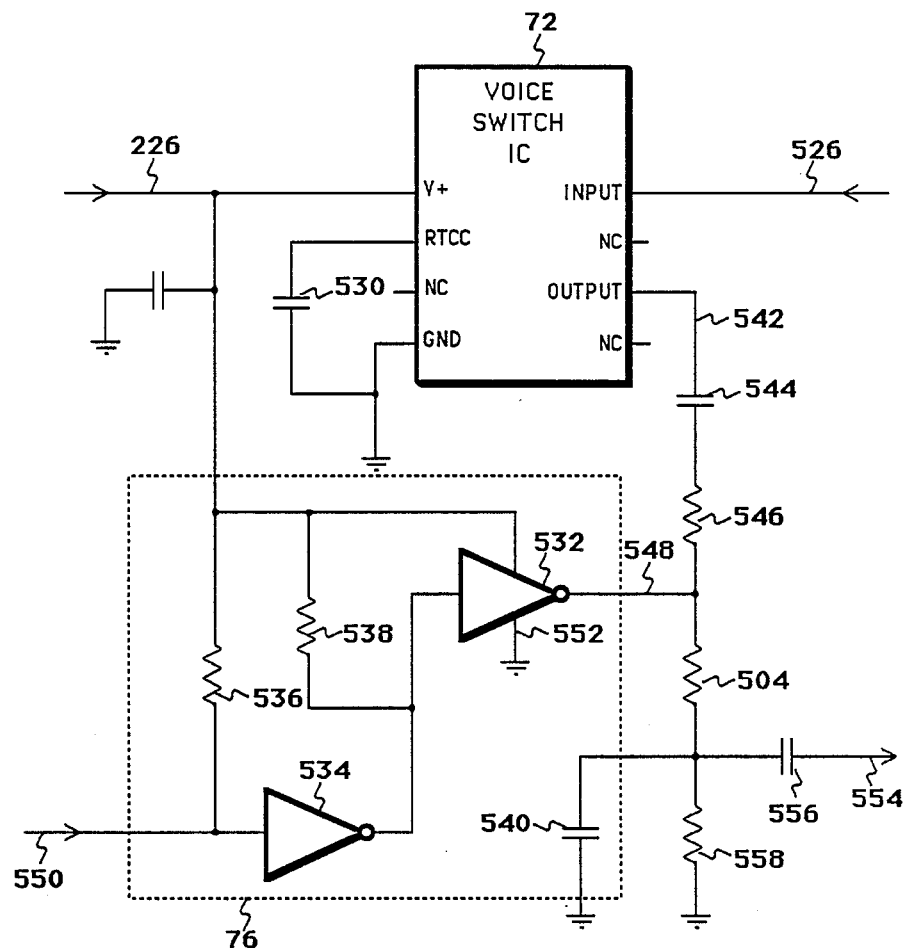
FIG. 12 is a schematic diagram showing connections to the voice switch IC in the telephone set of FIGS. 1 and 2.

After amplification and frequency response compensation as described above, the voice signal originating at the capsule microphone appears on line 526, as shown in FIG. 11, after passing through capacitor 528. On line 526, the transmit voice signal is carried to voice switch integrated circuit 72, shown in FIG. 12. Voice switch IC 72 of FIG. 12 is a voice frequency level expander typically used to condition amplified signals from electret-type microphones. In one embodiment, voice switch IC 72 is an LB1026AB- Voice Frequency Level Expander manufactured and sold by AT&T Technologies, Allentown, Pennsylvania, or the like. Voice switch IC 72 attenuates low-level signals that typically originate from background noise, and passes normal amplitude speech signals at unity gain. Voice switch IC's are commonly employed in telephones having highly sensitive microphone transducers in order to simulate the acoustical sensitivity of traditional carbon-granule telephone transducers, which naturally tend to filter out low-level signals as a result of their non-zero thresholds of sensitivity. The end result of using a frequency level expander such as the aforementioned LB1026AB is that the quality of telephone conversation is enhanced by reducing background sounds that might otherwise be heard during the speaker's silence. The use of frequency level expanders is particularly effective in office telephone applications where the suppression of undesirable background noise during lulls in conversation is desired.

The frequency-compensated capsule microphone voice signal is received by voice switch IC 72 on line 526, as previously noted with reference to FIG. 11. In particular, with reference to FIG. 12, line 526 is coupled to the INPUT pin of voice switching IC 72. The V+ pin of voice switch IC 72 receives a positive power supply voltage from output 226 of the one-half Vcc voltage supply circuit of FIG. 5. Capacitor 530 is coupled between an input pin of IC 72 labelled RTCC. Capacitor 530 determines the response time (attack and decay characteristics) of the output with respect to the input signal. The signal on the OUTPUT pin of IC 72 represents the input signal from line 526 conditioned to have the low-level signals attenuated as described above. More detailed description of typical applications and configurations of the LB1026AB device can be found in the data sheet for this device, published by AT&T Technologies and incorporated herein by reference.

With continued reference to FIG. 12, transmit mute circuitry 76 is shown in detail, comprising open-drain gate buffers 532 and 534, resistors 536 and 538, and capacitor 540. The output on line 542 from voice switch IC 72 passes through capacitor 544 and resistor 546, where it is combined with line 548 from mute circuit 76. Mute circuit 76 receives an input on line 550, which originates from the MUTE O output of custom logic IC 44 of FIG. 6. Mute circuit 76 is activated by a logical high-level signal on line 550. A logical high signal on line 550 forces the output of inverter 534 low, which in turn forces the output of inverter 532 high. Since inverter 532 is an open-drain device, a logical high output of inverter 532 allows the signal on line 542 to be coupled t ground via ground lines 548 and 552.

Figure 13:
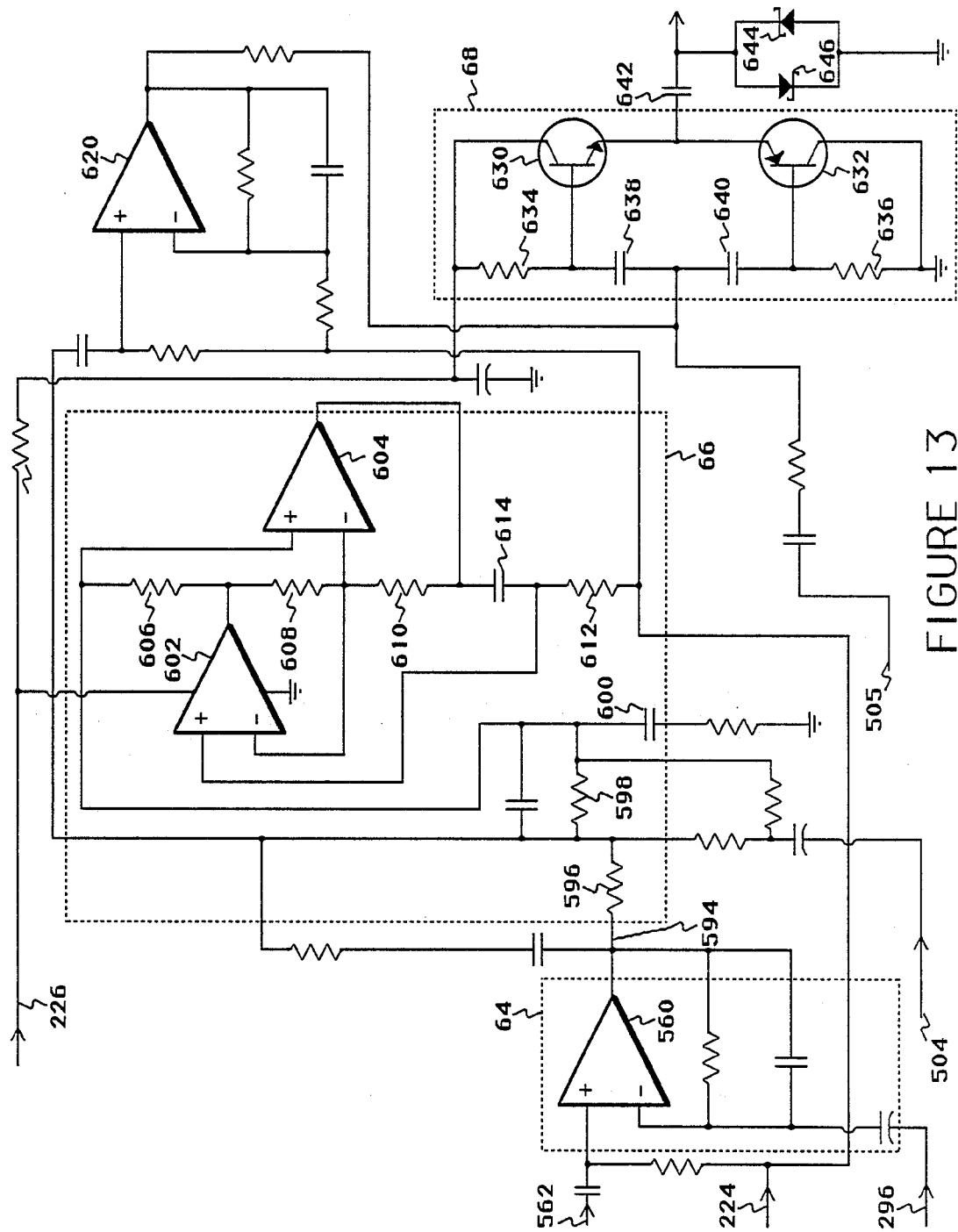
FIG. 13 is a schematic diagram of the headset receiver amplifying circuitry in the telephone set of FIGS. 1 and 2.

Turning now to FIG. 13, a schematic diagram of capsule receive amplification circuitry is shown, including receive gain-control amplifier 64, receive frequency response compensating circuitry 66, and receiver driver amplifier 68. The voice signal to be reproduced by receiver 70 is provided from voice IC 60, as will be hereinafter described with reference to FIG. 15. As shown in FIG. 13, this signal is provided to the non-inverting input of op-amp 560, via line 562. Receiver volume is adjusted by shorting various combinations of the four gain-controlling resistors 288, 290, 292, and 294 (from FIG. 6) to ground. Outputs AT A, AT B, AT C, and AT D of custom logic IC 44 are open-drain outputs, so that when each of these outputs is activated, a path is established between line 296 and ground via the corresponding resistor 288, 290, 292, or 294 coupled to that output. When outputs AT A, AT B, AT C, and AT D are not activated, the corresponding resistors 288, 290, 292, and 294 are de-coupled from the gain control circuit.

Thus, the resistance between line 296 and ground is varied according to which of the custom IC gain-control outputs AT A, AT B, AT C, and AT D are activated. Line 296, in turn, is coupled to the inverting input of gain control amplifier 560. The resistance between the inverting input of op-amp 560 and ground is varied according to the status of the custom IC gain control outputs.

Figure 14:
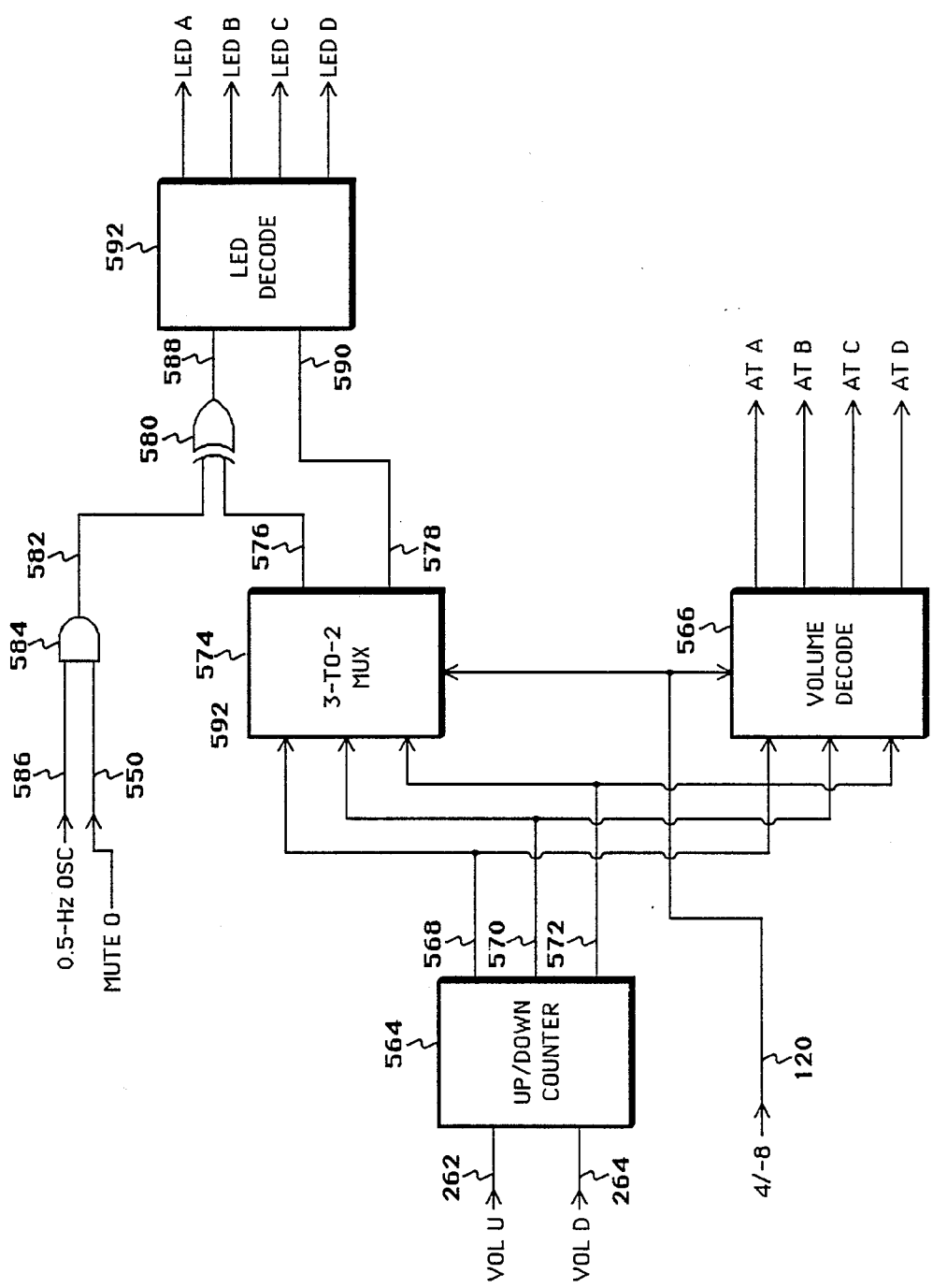
FIG. 14 is a schematic diagram showing LED control logic and receiver volume control logic implemented in the custom logic integrated circuit chip of the telephone set of FIGS. 1 and 2.

Implemented within custom logic IC 44 is volume control circuitry for responding to signals from volume control buttons 26 and 28. As previously noted, volume is adjustable in either four or eight discrete steps, as programmed by jumpers 280 and 282. In FIG. 14, the volume control circuitry implemented in custom IC 44 is shown, comprising an up/down counter 564 and decoding logic 566. Up/down counter 564 is a three-bit counter, having outputs 568, 570, and 572, wherein output 568 represents the least significant bit (LSB) of a three-bit binary value, and output 572 represents the most significant bit (MSB). The binary output of counter 564 is used to represent distinct states corresponding to each of the volume steps; depressing "+" button 26 causes up/down counter 564 to increment its binary output by one, while depressing "−" button 28 causes counter 564 to decrement its output by one. Decoding logic 566 receives counter outputs 568, 570, and 572 as inputs, and decodes the values thereon into four-bit words (states) that are sent to the four open-drain output buffers AT A, AT B, AT C, and AT D.

Up/down counter 564 keeps track of which volume step is currently selected, while decode logic 566 determines which of the four gain-control outputs are required to be active in order to create that volume level. In order to make this determination, decode logic 566 also uses the 4/−8 input signal to IC 44 (line 120) in order to activate buffers AT A, AT B, AT C and AT D appropriately for either the four or eight volume step modes.

Table 1 shows the logical states of up/down counter 564 and the corresponding four-bit states of output buffers AT A, AT B, AT C, and AT D for the four volume step mode. Note that output 572 of up/down counter is not used in the four volume step mode. From Table 1, it can be seen that a simple sequence with only one of the output buffers activated (low) in each state establishes the gain control signal on line 296.

Table 2 is a logic truth-table which shows the logical states of up/down counter 564 and the corresponding four-bit states of the output buffers for the eight volume step mode. In the eight step mode, certain four-bit combinations of the output buffers are skipped in order to get an approximately logarithmic variation in gain steps.

Since custom IC 44 is powered even during "on-hook" operation, this logic can retain the volume setting selected when the phone was last "off-hook", by preserving the output signals from up/down counter 564. Additionally, custom logic IC 44 presets volume to a nominal level in response to a low-going pulse on custom IC −RESET input, when the phone of FIGS. 1 and 2 is first powered up. The nominal volume level for the four and eight step modes is indicated in Tables 1 and 2, respectively.

As shown in FIG. 14, outputs 568, 570, and 572 are also coupled to the inputs of a 3-to-2 multiplexor 574. The select input of multiplexor 574 receives the VOLUME STEPS signal from line 120, which enters custom IC 44 at the 4/−8 pin. In the four volume step mode, the signal on line 120 is high, and the outputs 576 and 578 of multiplexor 574 are, respectively, counter outputs 570 and 568; in the eight volume step mode, the signal on line 120 is low, and the outputs 576 and 578 of multiplexor 574 are, respectively, counter outputs 572 and 570.

Line 576 is received at one input of EXCLUSIVE-OR (XOR) gate 580. The second input of XOR gate 580 receives the signal on line 582, which is the output of AND gate 584. AND gate 584 receives a 0.5-Hz oscillating signal on line 586 as a first input, and the output of "M" button 30 on line 266 as a second input. Thus, the output signal of AND gate 584 on line 582 is low whenever the transmit mute function of the telephone is not activated.

When the transmit mute function of the telephone of FIGS. 1 and 2 is not activated, therefore, the signal on line 576 is un-altered by XOR gate 580, and the signals on lines 576 and 578 are passed directly to the input lines 588 and 590, respectively, of LED decoder 592. LED decoder 592 has four outputs, corresponding to the four LED control outputs LED A, LED B, LED C, and LED D, of custom IC 44. Table 3 is a truth table showing the correspondence between the inputs 588 and 590 of decoder 592 and the four outputs of decoder 592.

Recall that in the four volume step mode, counter outputs 570 and 568 are selected as outputs 576 and 578, respectively, of multiplexor 574. When the transmit mute function is not activated, therefore, counter outputs 568 and 570 are decoded by decoder 592 according to the truth table of Table 3. Thus in the four volume step mode, LED 308 is activated for the lowest volume setting (with IC output LED A low, outputs LED B, LED C, and LED D high), LED 310 for the next higher volume setting, LED 312 for the next higher, and LED 314 is activated for the highest volume setting.

In the eight volume step mode, however, counter outputs 572 and 570 are selected to be the outputs 576 and 578, respectively, of multiplexor 574. In this case, therefore, the highest-order two bits of the counter output are applied to decoder inputs 588 and 590, respectively, and decoded according to the truth table of Table 3. Activation of LEDs 308, 310, 312, and 314 thus proceeds as follows: For the lowest two volume settings, LED 308 is activated (with IC output LED A low, and outputs LED B, LED C, and LED D high); for the next higher pair of volume settings, LED 310 is activated; for the next higher pair of volume settings, LED 312 is activated, and for the highest two volume settings, LED 314 is activated.

Recall from FIG. 6 that the logical level on line 266, coupled to the MUTE input of IC 44, is determined by "M" button 30; further recall that the transmit mute function is, in accordance with one aspect of the present invention, operable in either of two modes, as determined the MOM/−TOG input line 122 of IC 44. Activation of the transmit mute function is initiated by the MUTE 0 output signal of IC 44, carried by line 550. In momentary mute mode, (a logical high signal on line 122), the MUTE 0 output of IC 44 is high only while "M" button 30 is depressed; in the toggled mute mode, the MUTE 0 output on line 550 is toggled (inverted) each time "M" button 30 is depressed.

As shown in FIG. 14, the MUTE 0 output signal of IC 44 is also used internally, coupled to one input of AND gate 584. The other input to AND gate 584, on line 586, receives a 0.5-Hz oscillating signal, generated internally to IC 44, as previously described with reference to FIG. 7. When the transmit mute function is activated, either in momentary mute or toggled mute mode, the output 582 of AND gate 584 is also a 0.5-Hz oscillating signal. Output 582, in turn, is coupled to one input of XOR gate 580, the other input to this gate being the output 576 of multiplexor 574. This arrangement results in the inverting of the input 588 of LED decoder 550 every halfsecond. From Table 3, it can be seen that this has the effect of alternately blinking the current volume indication LED with the LED two positions away from it, whenever the transmit mute function is enabled, thus providing a visual indication to a user of when transmit muting is enabled. The implementation of the transmit muting function itself was previously described with reference to the circuit of FIG. 12, wherein the voice signal output of voice switch IC 72 (line 542) is diverted to ground when the MUTE 0 signal on line 550 is received by inverter 534.

Returning now to FIG. 13, the output, on line 594, of gain control amplifier 560 undergoes frequency response compensation in receive shaping circuit 66. The receiver frequency response is compensated by a voltage divider circuit, comprising resistors 596 and 598, with a tuned resonant circuit comprising capacitor 600 and an active gyrator (synthetic inductor) implemented with op-amps 602 and 604. Resistors 606, 608, 610, and 612 and capacitor 614 determine the value of the inductance, as in the synthetic inductor previously described with reference to FIG. 11.

A capsule receiver identification line (ID line) 504 is coupled to the receiver circuitry of FIG. 13. As with the capsule transmitter ID line 502 shown in FIG. 11, receiver ID line 504 allows for two different capsule response compensation configurations, depending upon whether line 504 is grounded or not. Line 504 is provided at the headset capsule connecting jack disposed on housing 2 of the telephone, along with line 502.

The output of response-shaping divider 66 is buffered and amplified by the amplifier formed with op-amp 620; next, the receiver voice signal is fed to the receiver driver amplifier 68, comprising bipolar npn transistor 630, bipolar pnp transistor 632, bias resistors 634 and 636, and capacitors 638 and 640, arranged in a push-pull type amplifier configuration. Capacitor 642 couples the output of driver 68 to the receiver 70, not shown in FIG. 13. Schottkey diodes 644 and 646 provide a limiting for a voltage overload condition at the input to receiver 70. Outputs 226 and 224 from the half-level supply circuit of FIG. 5 provide power for the op-amps 560, 602, 604 and 620 of FIG. 13.

Figure 15:
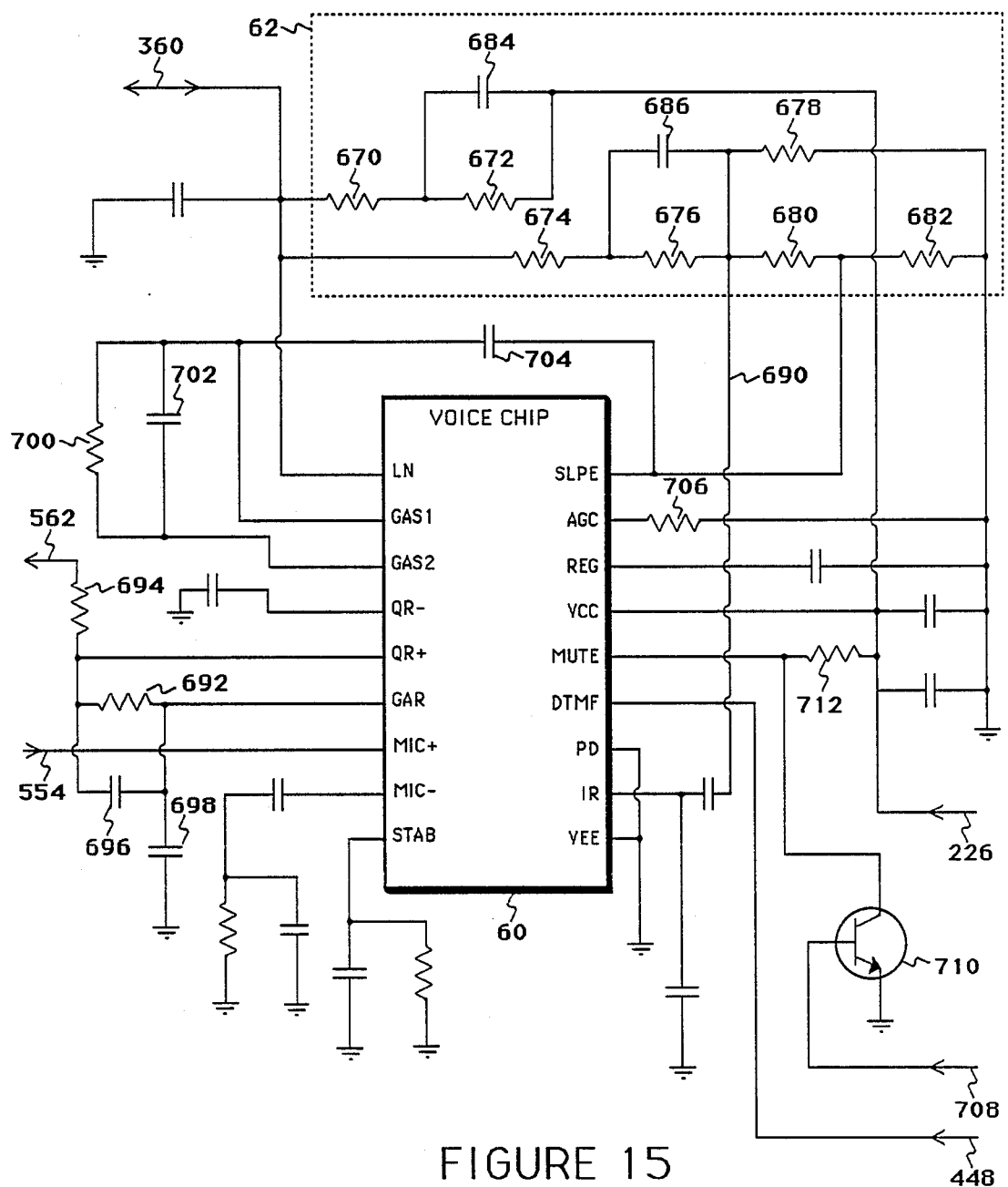
FIG. 15 is a schematic diagram showing the Wheatstone balancing circuit and connections to the voice transmission IC in the telephone set of FIGS. 1 and 2.

Turning now to FIG. 15, another portion of the voice circuitry of the telephone of the present invention is shown, including Wheatstone bridge balancing circuit 62, and voice IC 60. One of the functions performed by voice IC 60 is establishing the interface between the two-wire circuit (TIP line 104a and RING line 104b) used to communicate transmitted and received voice signals between the telephone and a central switching station and the four-wire circuit of the headset capsule transmitter and receiver, in order to permit full-duplex operation of the telephone.

In the field of communications, "full-duplex" means that the transmission of signals over the circuit can occur in both directions at the same time. Two-wire circuits comprising a conventional current-loop arrangement are used for the connection between a central switching station and a subscriber's telephone, since two-wire circuits are cheaper and easier to establish. Four-wire circuits, which have two wires for each direction, are used for almost all other circuits in a telephone network. Physical separation of the transmit and receive signals is needed on these circuits, so that transmit and receive amplifiers, such as those shown in FIGS. 11 and 13, may be used. A line balancing or line decoupling circuit is used to perform this separation of signals, and to establish the interface between a two-wire circuit and a four-wire circuit.

Figure 16:
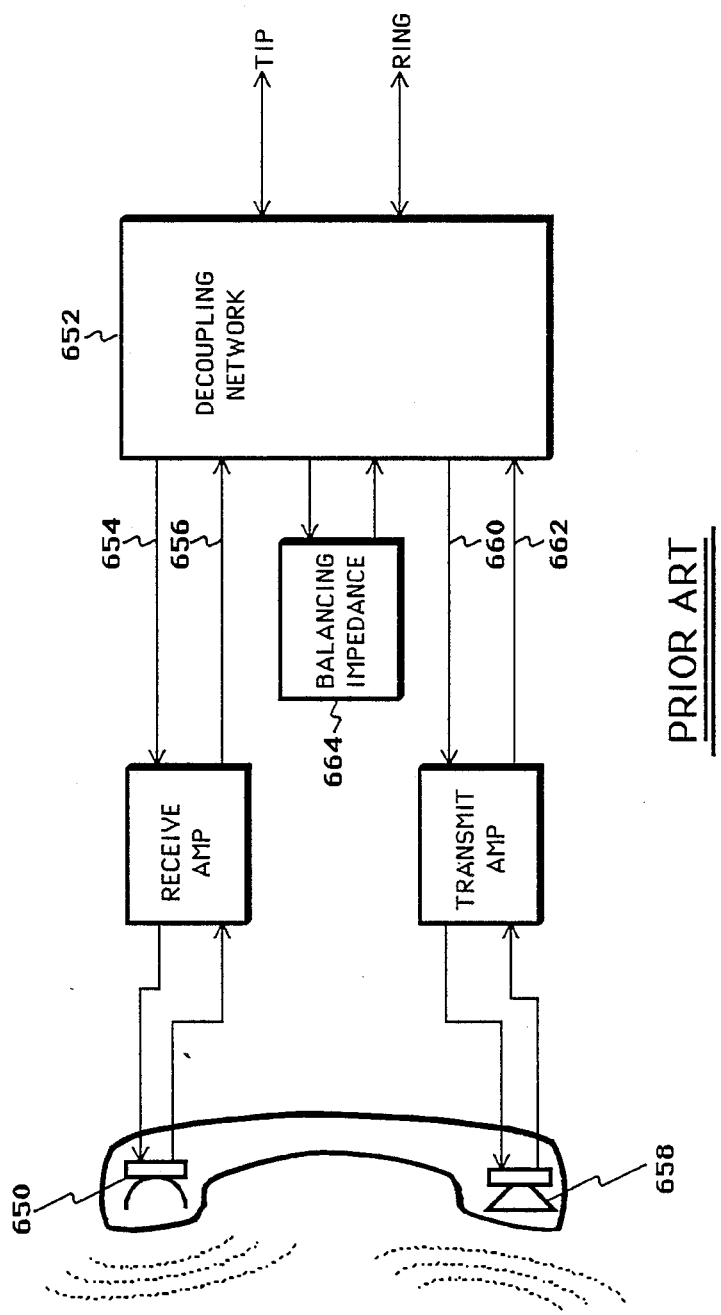
FIG. 16 is a block diagram showing the operation of a telephone receiver/transmitter decoupling network of the prior art.

A simplified equivalent circuit illustrating decoupling as typically practiced in the prior art is shown in FIG. 16. Receiver 650 receives voice signals from decoupling circuit 652 via the pair of lines 654 and 656; similarly, transmitter 658 sends voice signals to circuit 652 via the pair of lines 660 and 662. In a conventional manner, decoupling circuit 652 communicates with a central switching station using the current loop on the two-wire network comprising standard TIP and RING lines. Decoupling circuit 652 must ensure that incoming voice signals on TIP and RING are forwarded to receiver 650 but not to transmitter 658. Likewise, circuit 652 must receive voice signals from transmitter 658 and forward these signals to the central station via the current loop on TIP and RING.

In order to accomplish these functions, circuit 652 operates in conjunction with a balancing impedance 664 to match the impedances of the transmitter, receiver, and TIP/RING lines such that transmitted signals are passed from the transmitter 658 to the TIP/RING lines, and received signals are passed from the receiver to the TIP/RING lines. An additional feature of telephone decoupling networks is the allowance for a fraction of the signal generated from transmitter 658 to be passed to the receiver 650. This signal is referred to as a "sidetone signal", and is produced by creating a slight imbalance in balancing impedance 664. Sidetone is necessary so that the person using the telephone can hear his/her own voice from the receiver to determine how loudly to speak. The level of the sidetone signal is important, since too much sidetone will cause the speaker to speak to softly for reception by the called party, and too little sidetone will cause the speaker to speak to loudly.

Various manufacturers market integrated circuits which perform the two-way speech circuit functions described above. In one embodiment of the invention, voice IC 60 is a Philips/Signetics TEA 1067 Low Voltage Transmission IC With Dialer Interface. The TEA 1067 is a bipolar integrated circuit which performs the aforementioned speech and line interface functions required in fully electronic telephone sets. Referring again to FIG. 15, Wheatstone bridge 62, comprising resistors 670, 672, 674, 676, 678, 680, and 682, and capacitors 684 and 686, functions as the balancing impedance for the decoupling function performed by voice IC 60 in the telephone of FIGS. 1 and 2.

Recall from FIG. 2 that the incoming voice signal from the current loop of TIP line 104a and RING line 104b is superimposed on the DC signal propagating through electronic hook-switch 58. The voice signal current loop path traverses the source-drain path p-channel VMOS hook-switch transistor and is received by line 170, as shown in FIG. 8. Capacitor 316 provides a path for the voice signal to bypass LED circuitry 100. Finally, with reference now to FIG. 15, the incoming voice signal current is received on line 360 at the input of Wheatstone bridge 62. Wheatstone bridge 62 performs the function of impedance balancing as hereinabove described with reference to FIG. 14.

The receive output of Wheatstone bridge 62 is coupled, via line 690, to the receiving amplifier input (IR input) of voice chip 60. The gain of the receiver signal is adjusted by means of resistors 692 and 694 in con]unction with capacitors 696 and 698, coupled as shown in FIG. 15 to the receiver gain adjustment (GAR) input of voice chip 60. The receiver output signal is taken from the non-inverting receiver output (QR+) of voice chip 60. The receiver signal is coupled, via line 562, to the non-inverting input of op-amp 560, as previously described with reference to FIG. 13. The input signal at the IR pin of voice chip 60 is typically amplified by 31-dB or so before this signal is driven on the QR+receiver output.

The microphone output voice signal is received at the non-inverting (MIC+) input to voice chip 60. The voice signal to be transmitted to the called phone via the central station is presented at the LN line output pin of voice chip 60. Amplification of the transmit signal from the MIC+ input to the LN output of voice chip 60 is typically on the order of 52-dB. Resistor 700, and capacitors 702 and 704 are coupled between the GAS1, GAS2 and SLPE pins of voice chip 60. GAS1 and GAS2 are gain adjustment inputs for determining the gain of the transmitter amplifier; the SLPE input is used to adjust the DC resistance of voice chip 60. Resistor 706 is situated between the ACG input of voice chip 60 and ground, and is used to adjust the automatic gain control function of voice chip 60. The automatic gain control feature of voice chip 60 varies the amplification of the internal microphone amplifier and receiver amplifier in accordance with the DC line current.

A signal on line 708 is received at the base terminal of transistor 710 in FIG. 15, so that when line 708 is high, transistor 710 is made conductive, coupling the MUTE input pin of voice chip 60 to ground via its emitter terminal. When the signal on line 708 is low, however, transistor 710 is off, and the MUTE input of voice chip 60 is pulled high due to the positive voltage supplied via line 226 (from FIG. 5) through resistor 712. The signal on line 708 is generated from the −XMT MUTE output of dialer IC 86, as shown in FIG. 10. This output signal is driven low whenever dialer IC 86 is generating DTMF dialing tones. Transistor 710 functions as a logic inverter for the −XMT MUTE output signal, so that when XMT MUTE is low, the MUTE input to voice chip 60 is driven high. A high level signal at the MUTE input to voice chip 60 enables the DTMF input of that chip, inhibits the microphone inputs MIC+ and MIC− and the receiving amplifier input IR.

During DTMF dialing, dialer IC 86 generates DTMF dialing tones on its DTMF 0 output; at the same time, dialer IC 86 drives its −XMT MUTE output high. Voice chip 60 receives the dialing tones at its DTMF input on line 448, and receives the −XMT MUTE signal on line 708. When the DTMF input is enabled, dialing tones received at DTMF are sent onto the telephone line via the LN output of voice chip 60. The voltage amplification from the DTMF input of voice chip 60 to the LN output is typically 25.5-dB, the amplification being proportional to the external impedance of resistor 700 and capacitor 702 coupled between the GAS1 and GAS2 pins of voice chip 60.

Additional connections to voice chip 60 shown in FIG. 15 are made in accordance with recommendations in the product specification for this device, published by the manufacturer and incorporated herein by reference.

From the foregoing detailed description, is should be evident that a fully-featured, line powered electronic telephone for use with a telephone headset apparatus has been disclosed. The disclosed telephone overcomes several of the shortcomings of previous electronic telephones, particularly with regard to the power consumption, voice signal quality, and compatibility with various headsets and transmission systems of the prior devices. Although a specific embodiment of the invention has been disclosed in detail, this was strictly for the purpose of illustrating the general design principles underlying the invention, and it is to be understood that various changes, alterations and substitutions can be made therein without departing from the spirit and scope of the invention as defined in the appended claims. In particular, with respect to the various commercially-available devices cited herein, it should be realized that other devices for performing the same functions may be available which are equally suitable for use in a telephone in accordance with the present invention.

In addition, with regard to such design options as the number of volume-steps, the number of selectable frequency response compensation modes, the number and placement of visual indicators, and so forth, it should be understood that particular implementations of these features have been described merely for the purpose of illustration, and are not intended to limit the scope of the present invention to the disclosed specific embodiment.

TABLE 1

| UP/DOWN COUNTER OUTPUTS | | VOLUME DECODER OUTPUTS | | | |
|---|---|---|---|---|---|
| 568 | 570 | AT A | AT B | AT C | AT D |
| 0 | 0 | 1 | 1 | 1 | 0 |
| * 0 | 1 | 1 | 1 | 0 | 1 |
| 1 | 0 | 1 | 0 | 1 | 1 |
| 0 | 1 | 0 | 1 | 1 | 1 |

\* = nominal volume setting

TABLE 2

| UP/DOWN COUNTER OUTPUTS | | | VOLUME DECODER OUTPUTS | | | |
|---|---|---|---|---|---|---|
| 568 | 570 | 572 | AT A | AT B | AT C | AT D |
| 0 | 0 | 0 | 0 | 0 | 0 | 0 |
| 0 | 0 | 1 | 0 | 1 | 0 | 0 |
| * 0 | 1 | 0 | 0 | 1 | 1 | 1 |
| 0 | 1 | 1 | 1 | 0 | 0 | 1 |
| 1 | 0 | 0 | 1 | 0 | 1 | 1 |
| 1 | 0 | 1 | 1 | 1 | 0 | 1 |
| 1 | 1 | 0 | 1 | 1 | 1 | 0 |
| 1 | 1 | 1 | 1 | 1 | 1 | 1 |

\* = nominal volume setting

TABLE 3

| LED DECODER INPUTS | | LED DECODER OUTPUT | | | |
|---|---|---|---|---|---|
| 588 | 590 | LED A | LED B | LED C | LED D |
| 0 | 0 | 0 | 1 | 1 | 1 |
| 0 | 1 | 1 | 0 | 1 | 1 |
| 1 | 0 | 1 | 1 | 0 | 1 |
| 0 | 1 | 1 | 1 | 1 | 0 |

What is claimed is:

1. An electronic, line-powered telephone set for use with a telephone headset apparatus having a receiver and a microphone, said telephone set compatible with a standard telephone transmission system having at least first and second lines for establishing a loop connection between said telephone set and a central switching station, said telephone set comprising:

ringing means, selectively coupled either to said first and second lines or to said first line and a third line, responsive to the presence of an alternating-current ringing signal thereon for heralding an incoming telephone call;

dialing means for initiating outgoing telephone calls, said dialing means selectably capable of initiating the issuance of dialing pulses and dialing tones on said first and second lines, said dialing means further having memory means for storing dialing sequences and having the capability to issue said stored dialing sequences to said first and second lines under direction of a user;

rectifying means coupled to said first and second lines for receiving therefrom direct-current supplied from batteries in the central station, and producing a rectified, direct-current signal for powering electronic components of the telephone;

surge protector means coupled to said first and second lines for preventing internal components of the telephone from being exposed to voltages exceeding a predetermined threshold;

an electronic hook-switch circuit receiving the rectified, direct-current power signal from said rectifying means, the hook-switch circuit for selectively establishing the loop connection with the central station, such that when a loop connection is established, variations in the amount of current conducted in said loop are used to communicate voice information between the telephone set and the central station, said variations in current being superimposed upon the direct-current signal received from said rectifying means, the hook-switch circuit also providing a switched, direct-current output signal which has a non-zero level only when a loop connection is established low-current regulator means receiving the rectified DC power signal for providing a low-current output power signal to components of the telephone set during periods when a loop connection is not established;

high-current regulator means receiving the low-current output power signal from the low current regulator and the switched direct-current signal from the hook-switch circuit, for providing a higher-current output power signal to components of the telephone set during periods when a loop connection is established;

bell-tap suppression circuit including an opticoupler, coupled to said first, second, and third lines, for preventing said ringing means from responding to voltage transients on said first, second, and third lines which may be generated during pulse dialing;

an electronic controlling circuit receiving power signals from said low-current regulator and said high current regulator, said controlling circuit having a plurality of input terminals and a plurality of output terminals, electrical storage means receiving said low-current output power signal and said high-current output power signal, for storing electrical energy provided therefrom, said stored electrical energy being used by the dialing means, the hook switch circuit, and the controlling circuit during periods when a loop connection is not established;

voice signal processing means, including a receiver amplifier and a transmitter amplifier, coupled to said first and second lines, for establishing full-duplex voice communication between the telephone and the central station via a loop connection;

switching means coupled to said headset apparatus and to the voice signal processing means for identifying the type of said headset, and for adjusting the operation of the voice signal processing means according to the type of the headset;

indicator means for indicating the gain level of the receiver amplifier, for indicating when a loop connection is established, and for indicating the gain level of the transmitter amplifier;

a first subset of said controlling circuit input terminals coupled to the output terminals of a plurality of user-operated switches, for receiving a plurality of user control signals therefrom;

a second subset of said controlling circuit input terminals coupled to said dialing means, for receiving a plurality of dialing control signals therefrom;

a first subset of said controlling circuit output terminals coupled to said voice signal processing means, for issuing a plurality of volume control signals thereto, the gain of said receiver amplifier being adjusted in response to said volume control signals, and said volume control signals being issued in response to said user control signals;

a second subset of said controlling circuit output terminals coupled to the electronic hook-switch circuit, for issuing hook-switch control signals thereto, said electronic hook-switch circuit selectively establishing a loop connection with said first and second lines in response to said hook-switch control signals, said hook-switch control signals being issued in response to said dialing control signals and said user control signals;

a third subset of said controlling circuit output terminals coupled to the indicator means, for issuing indicator control signals thereto, the indicator means responsive to said indicator control signals to indicate the status of the hook-switch circuit, the gain of the receiver amplifier, and the gain of the transmitter amplifier.

2. An electronic telephone according to claim 1, wherein the switching means determines the frequency response characteristics of the receiver amplifier and the transmitter amplifier, said receiver amplifier and said transmitter amplifier each having at least two different, selectable frequency responses.

3. An electronic, line-powered telephone set according to claim 1, wherein a further one of said electronic controlling circuit output terminals is coupled to a control input of said electronic hook-switch circuit, and wherein said electronic hook-switch circuit comprises first and second transistors of opposite conductivity types, configured such that a low-level logic signal provided at said hook-switch control input from said electronic controlling circuit prevents said first and second transistors from conducting, thus preventing completion of a local-loop connection with the central station, while a high-level logic signal on said control input causes said first and second transistors to be conductive, thus completing the local loop; and wherein a user-actuated switch produces a switched output signal, said switched output signal being received at one of said plurality of electronic controller responds to actuation of the user switch by logically inverting the output signal received at the control input of said electronic hook-switch.

4. An electronic, line-powered telephone set according to claim 1, wherein said low-current output power signal from said low-current regulator means charges said electrical storage means at a low rate during periods when no loop connection is established and said high-current power signal from said high-current regulator means charges the electrical storage means at a high rate during periods when a loop connection is established, such that said memory means in the dialer is provided with an uninterrupted power signal from the electrical storage means.

5. An electronic telephone set compatible with standard local-loop-type telephone transmission systems having at lease first and second wires extending to a central switching station, said telephone set comprising:

an electronic controller having a plurality of input terminals and a plurality of output terminals;

user-actuated means providing a plurality of output signals, for controlling the volume level of sound produced by the receiver of said telephone, and for controlling the level of the voice signal transmitted from the telephone, said output signals received at the input terminals of the electronic controller;

a plurality of indicators for providing a visual indication of said receiver volume level, of said transmitted voice signal level, and of the status of the loop connection between the telephone and the central station, said indicators receiving signals from the plurality of controller output terminals;

wherein the controller is responsive to the output signals from the user-actuated means to selectively activate individual ones of the plurality of indicators, such that: at least one indicator is activated whenever a loop connection is established; each indicator corresponds to a distinct receiver volume range; and two alternately blinking indicators corresponds to a reduction in the level of the transmitted voice signal.

* * * * *

UNITED STATES PATENT AND TRADEMARK OFFICE
CERTIFICATE OF CORRECTION

PATENT NO. : 4,975,949
DATED : December 4, 1990
INVENTOR(S) : Jeff M. Wimsatt et al.

It is certified that error appears in the above-identified patent and that said Letters Patent is hereby corrected as shown below:

Column 36, line 3: after the word controller insert:

--circuit input terminals, such that the controller circuit--.

Column 36, line 21: [lease] and insert --least--.

Signed and Sealed this

Twenty-sixth Day of May, 1992

Attest:

DOUGLAS B. COMER

*Attesting Officer*  *Acting Commissioner of Patents and Trademarks*